United States Patent [19]
Macdonald

[11] Patent Number: 5,900,864
[45] Date of Patent: May 4, 1999

[54] HUMAN/MACHINE INTERFACE FOR COMPUTING DEVICES

[75] Inventor: Bruce William Macdonald, Townsville, Australia

[73] Assignee: Australian Institute of Marine Science, Queensland, Australia

[21] Appl. No.: 08/737,428
[22] PCT Filed: May 23, 1995
[86] PCT No.: PCT/AU95/00300
 § 371 Date: Apr. 7, 1997
 § 102(e) Date: Apr. 7, 1997
[87] PCT Pub. No.: WO95/32461
 PCT Pub. Date: Nov. 30, 1995

[30] Foreign Application Priority Data

May 23, 1994 [AU] Australia ................................ PM5806
Aug. 19, 1994 [AU] Australia ................................ PM7560

[51] Int. Cl.⁶ ..................................................... G09G 5/00
[52] U.S. Cl. ........................... 345/172; 345/168; 345/169; 345/334; 341/21
[58] Field of Search .................................... 345/169, 172, 345/168, 332–334; 341/20, 21, 22

[56] References Cited

U.S. PATENT DOCUMENTS

| | | | |
|---|---|---|---|
| 4,067,431 | 1/1978 | Whitaker | 197/98 |
| 4,360,892 | 11/1982 | Endfield | 364/900 |
| 4,366,475 | 12/1982 | Kishi et al. | 340/731 |
| 4,458,238 | 7/1984 | Learn | 345/172 |
| 4,791,408 | 12/1988 | Heusinkveld | 345/172 |
| 4,831,218 | 5/1989 | Wright | 200/5 A |
| 4,971,465 | 11/1990 | Hashimoto | 400/485 |
| 5,087,910 | 2/1992 | Guyot-Sionnest | 345/172 |
| 5,432,510 | 7/1995 | Matthews | 341/20 |
| 5,543,818 | 8/1996 | Scott | 345/168 |

FOREIGN PATENT DOCUMENTS

| | | |
|---|---|---|
| 2386-090 | 3/1977 | France . |
| WO 85/01914 | 5/1985 | WIPO . |
| WO 94/06264 | 3/1994 | WIPO . |
| WO 95/13576 | 5/1995 | WIPO . |

Primary Examiner—Jeffery A. Hofsass
Assistant Examiner—Julie Lieu
Attorney, Agent, or Firm—Lyon & Lyon LLP

[57] ABSTRACT

A computing device having a human/machine interface is disclosed. An input device (10) has a plurality of keys (T, 1, 2, 3, 4) each corresponding to a separate digit of the human hand. The keys (T, 1, 2, 3, 4) are arranged to match the relative sequential relation of the digits. The input device (10) is coupled to a processor device (3) in turn coupled to a visual display device (5). The processor device (30) receives instructions or data from the input device (10) and output information to be displayed to the display device (5). The processor device (30) is programmed to cause the visual display of indicia (60–70) wherein each indicium represents a user initiated instruction of data input and is displayed in one-to-one correspondence with the sequential relation of one or more of the keys (T, 1, 2, 3, 4).

24 Claims, 21 Drawing Sheets

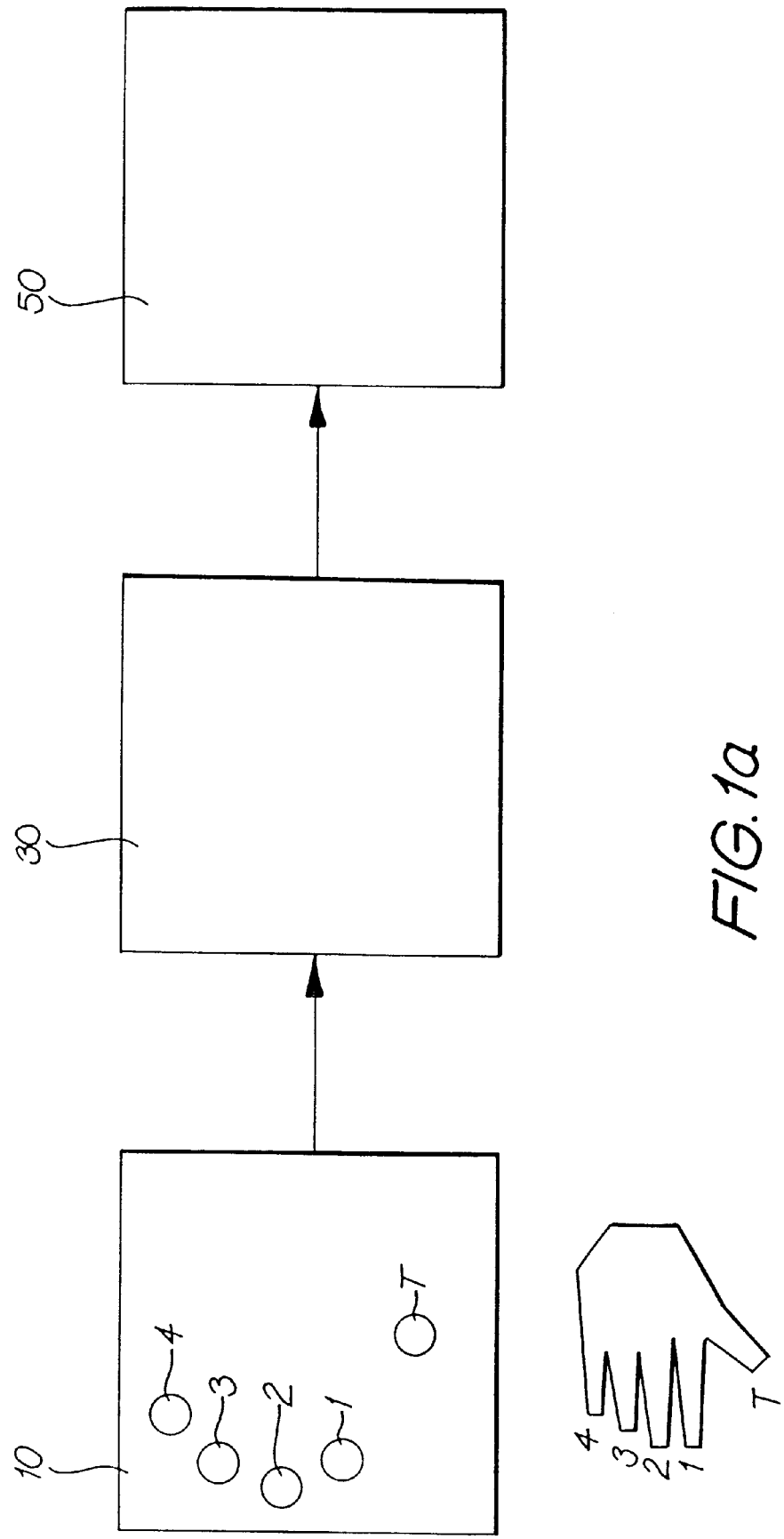

| n | u | x | j | f |
|---|---|---|---|---|
| c | b | k | g | q |
| t | d | r | m | y |
| i | a | h | v | w |
| e | o | s | p | l |
| SPACE | | | | |

| RETURN | z |
|---|---|
| BACKSPACE | NUMBERS |
| TAB | SYMBOLS |
| COMMA | SHIFT LOCK |
| PERIOD | SHIFT |

FIG. 10

＃ HUMAN/MACHINE INTERFACE FOR COMPUTING DEVICES

FIELD OF THE INVENTION

This invention relates to a human/machine interface for computing devices. The interface is particularly, but not exclusively, suited to use with computing devices implemented in a compact format, and for computing devices to be used in mobile and adverse environments.

BACKGROUND OF THE INVENTION

A particular type of human/machine interface is termed a graphical user interface, and basically is constituted by software resident in a computing device that translates instructions or data to visual information to be displayed on a visual display device.

One simple form of graphical user interface is text-based and utilises cursor control to enable navigation about a screen, however the predominant trend in known graphical user interfaces is the use of "windowing" systems that operate by 'point and click' actions by the user. Examples of windowing software systems are Apple QUICKDRAW, Microsoft WINDOWS and XWINDOWS created by MIT. Often windowing interfaces also incorporate the earlier form of cursor control, giving the user some form of flexibility in operation of the computing device, particularly with respect to data input. The icons and windowing structures presented to the user do not, however, provide access to the galaxy of commands and operations, so it is always necessary for the user to resort to operation of the keys of a conventional qwerty keyboard. There thus is the need for the user to learn and remember the qwerty keyboard layout.

Other examples of human/machine interfaces can be obtained from the text "Cognitive Aspects of Visual Languages & Visual Interfaces", edited by M. J. Tauber et al, published by North-Holland, Amsterdam, 1994.

Conventional user input devices such as keyboards, mouses and track balls require a benign and stable environment since the user must exhibit fine nervous system motor control in the use of the fingers. Mobile environments do not lend themselves to such fine movements, and can make operation of computing devices impracticable or even impossible.

The present invention is directed to overcoming or at least ameliorating one or more of the disadvantages noted above. Alternatively, or additionally, it can also be said to provide a useful alternative to known human/machine interfaces.

The present invention is directed to a human/machine interface that operates on the principle of 'what you see is what you press', and therefore removes the need for the user to be familiar with operational commands or the qwerty keyboard layout, rather maps input keystrokes directly from the display to the input device.

The human/machine interface of the present invention is particularly suited to use: (a) underwater, where there is a restricted range of human movement; (b) in a terrestrial mobile environment, (i.e. particularly 'wearable computers' and in vehicle-borne situations) where high levels of motion make it difficult for the user to operate a computing device via an input device; and (c) in airborne environments, where there are again high levels of motion acting on the user of the computing device.

It is convenient now to define some of the terminology that is used throughout the specification.

The fingers and thumb of the human hand are referred to as "digits". The term "digits" also embraces toes.

A "key" is to be understood as an input transducer operated by a single digit, and can include a pushbutton, switch, force transducer or the like. An "input device" typically can have four keys, one for each of the fingers, and one or more "keys" for the thumb, given that the thumb has greater dexterity than the fingers. Even so, there can be any number of keys in the range 1 to 5. The activation/operation of one or a combination of the keys at the same time is referred to as a "chord". A "couplet" is two consecutive chords, or two simultaneous chords performed by the left and right hand.

A "display device" is to be understood a hardware element such as a video monitor or liquid crystal display. The display device thus presents the viewer with an image that, for convenience, will be termed a "display".

A display visually presents "indicia". An indicium is presented in a manner that represents one or more keys. A number of indicia in close spatial or sequential arrangement is termed a "panel". Each panel overlays a number of notional non-overlapping sequential regions. In that sense the regions can also be thought of as partitioning a portion of the display. An indicium can span over one or more regions in the sense that it is oriented substantially orthogonally to the regions. An indicium itself can be either contiguous or discontiguous. An indicium also is referred to as a "button".

SUMMARY OF THE INVENTION

Therefore, in one form the invention discloses a computing device having a human/machine interface comprising:

an input device having a plurality of keys each corresponding to a separate digit of the human hand, the keys being arranged to match the relative sequential relation of the digits;

a visual display device; and a processor device receiving instructions or data from the input device and outputting information to the display device, the processor device being programmed to cause the visual display of indicia, and wherein each indicium represents a user initiated instruction or data input and is displayed in one-to-one correspondence with the sequential relation of one or more of the keys.

Preferably, in use the computing device, a user temporally notionally partitions the visual display of the display device into a plurality of non-overlapping regions, each region corresponding to one of the digits, and the regions being in the same sequential relation as the digits, and whereby any one or more regions intersected by an indicium corresponds to the combination of keys that give effect to the instruction or data input represented by the indicium.

Preferably, the indicia and the regions are arranged orthogonally.

Preferably, there are five keys, and therefore five notional regions.

Advantageously, some of the user initiated instructions or data inputs correspond to at least two discrete combinations of keys.

Preferably, the indicia are arranged within a panel, and a number of panels can be displayed on the display device. A panel can be coterminous with the corresponding regions.

Preferably, the input device further comprises at least two extra keys, each operable by a respective opposite articulation of the thumb with respect to the thumb key, each extra key being visually displayed on the display means by a separate indicium, such as a thumbline arranged to be either atop a panel or below a panel respectively to indicate the direction of articulation of the thumb.

The invention in another form further discloses a human/machine interface program for implementation on a computing device, the computing device including an input device having a plurality of keys each corresponding to a separate digit of the human hand, the keys being arranged to match the relative sequential relation of the digits, a visual display device and a processor device to give effect to the program, the program comprising:

an input element to receive instructions or data from the input device;

an output element to pass display information to the display device; and a processing element, coupled to the input element and the output element, to cause the display of indicia, and wherein each indicium represents a user initiated instruction or data input and is displayed in one-to-one correspondence with the sequential relation of one or more of the keys.

In a preferred form, some of the user initiated instructions or data inputs correspond to at least two discrete combinations of keys.

The invention in a yet further form discloses a method for implementing a human/machine interface for a computing device, the computing device including an input device having a plurality of keys each corresponding to a separate digit of the human hand, the keys being arranged to match the relative sequential relation of the digits, and a visual display device; the method comprising the steps, implemented on processor means, of:

visually displaying indicia on the display device, each indicium being in one-to-one correspondence with the sequential relation of one or more of the keys, thereby to allow input of an instruction or data represented by each indicium by the respective one or more keys.

Preferably, in practice of the method a user performs the steps of:

notional partitioning the visual display device into a plurality of non-overlapping regions, each region corresponding to a key and being arranged with the same sequential relation as the digits; and activating the one or more keys corresponding to the one or more regions intersected by an indicium to give effect to the instruction or data input represented by the indicium.

Preferably, there are five keys, and therefore five notional regions.

Preferably, the method further comprises the steps of displaying two extra indicia, each extra indicium corresponding to a shifted state of the user's thumb, thus providing for implementation of further instructions or data inputs.

The invention yet further discloses a method for implementing a human/machine interface for a computing device, the computing device including an input device having a plurality of keys each corresponding to a separate digit of the human hand, the keys being arranged to match the relative sequential relation to the digits, and a visual display device; the method comprising the step, implemented on processor means, of:

displaying a regular array of indicia on the display device, each row and column of the array respectively being in correspondence, in an orthogonal manner, with the sequential relation of one or more of the keys, and each indicium corresponding to a sequence of a row and a column key, thereby to allow input of instruction or data represented by each indicium by the respective sequence of keys.

In a most preferred form the sequence of the keys commences with the thumb.

BRIEF DESCRIPTION OF THE DRAWINGS

Embodiments of the invention now will be described with reference to the accompanying drawings, in which:

FIGS. 1a and 1b show schematic arrangements of a computing device for implementing a man/machine interface;

FIG. 10 shows a virtual typewriter;

DESCRIPTION OF PREFERRED EMBODIMENTS

Figure 1B:
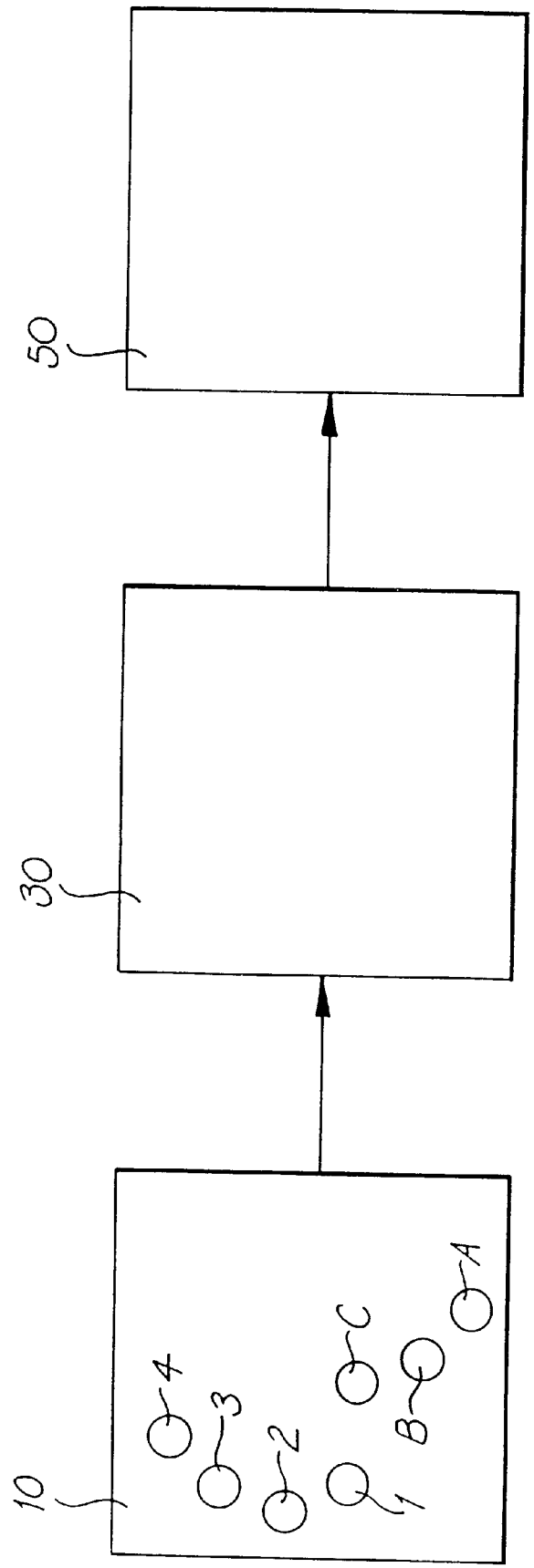

FIG. 1a shows a schematic arrangement for the human/machine interface implemented on a computing device. An input device 10 is coupled with a processing device 30, in turn coupled with a display device 50. The input device 10 has five input keys which are denoted as 4,3,2,1 and T. As is apparent from the representation of the human hand, each of the fingers and the thumb correspond sequentially to the like-referenced keys, and any activation of one or a combination of keys produces "a chord". FIG. 1b shows two thumb keys C,A in addition to the T key that serve a special function which presently will be described.

The processing device 30 can be any off-the-shelf personal computer, although for mobile applications should be compact and rugged in nature; for example, in the PC/104 format. The display device 50 also can be conventional, although again it is preferred that it be as compact as possible, and in this respect the PRIVATE EYE (TM) device manufactured by Reflection Technology, Inc. is particularly suitable.

In operation, the processing device 30 causes a display of information on the display device 50. In response to that information, the user inputs instructions or data by means of keyed chords. Indicia displayed on the display 50 corresponds directly to a particular chord, thus giving effect to either the instruction or data input represented by the indicium. As noted above, the principle is essentially 'what you see is what you press'.

Figure 2:
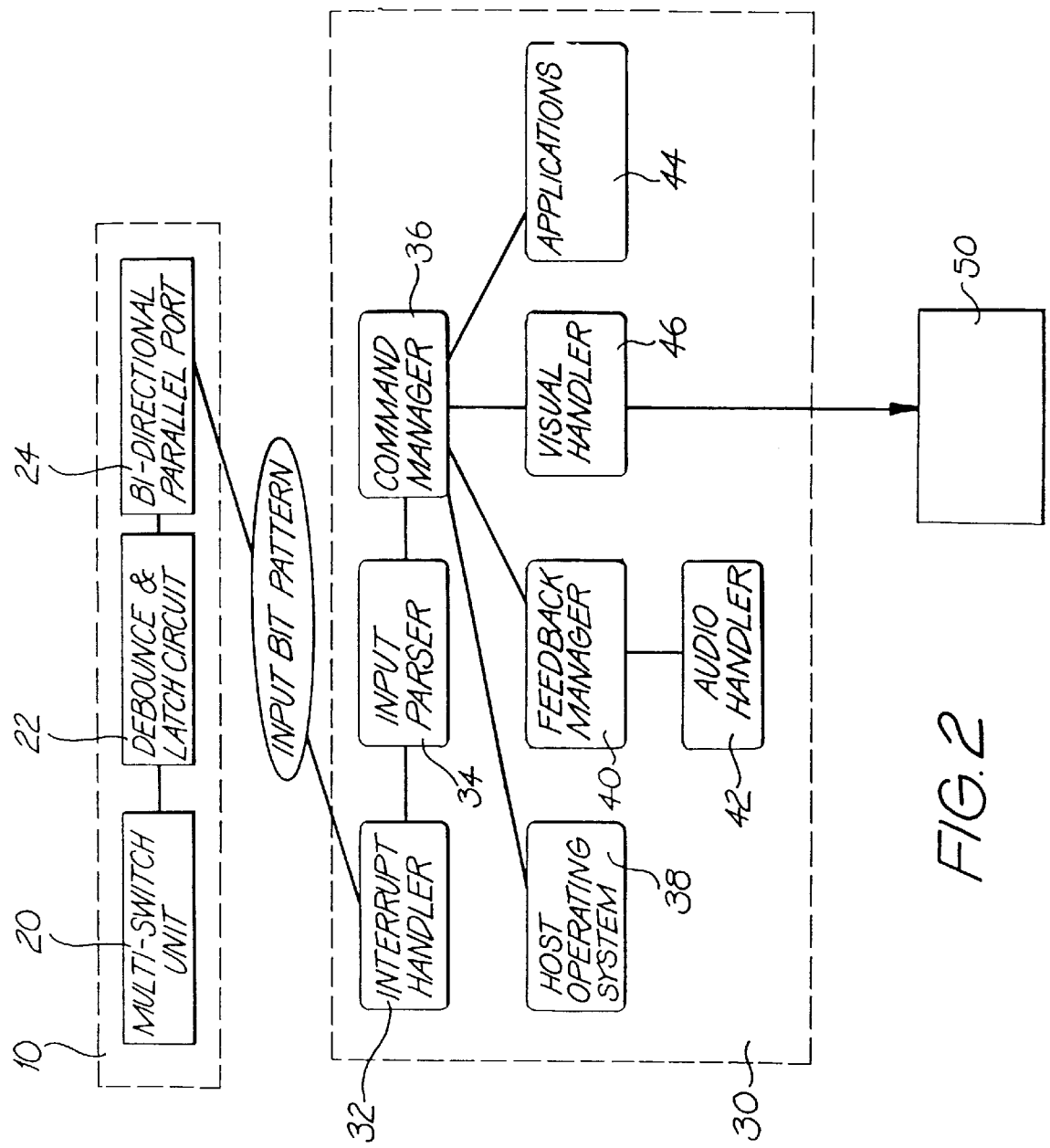
FIG. 2 shows a functional block diagram for the computing device of FIGS. 1a and 1b.

FIG. 2 shows a functional block diagram of a computing device upon which the human/machine interface can be implemented. The input device 10 comprises a multi-switch unit 20 constituted by the keys 4–1,T shown in FIG. 1a. The switch unit 20 is connected to a debounce and latch circuit 22 that is configured to output signals only on release of the keys, as opposed to on initial depression of the keys. In this way, individual keys in a combination of keys can be depressed separately in time, however only the total combination is signalled when all those keys are coincidentally released. The output from the debounce and latch circuit 22 passes to a bi-directional parallel port 24 of a conventional type, with the output thereof constituting a bit pattern that can be decoded by the software resident in the processing device 30. In one preferred form the input bit pattern is binary coded leading to a raw decimal value for any chord as a combination of key presses.

In the same way as a conventional keyboard inputs to a personal computer, the input bit pattern functions as an interrupt to the operating system. The interrupt function is represented by the interrupt handler 32. The interrupts then pass via an input parser 34 to a command manager 36. The command manager 36 interacts with the host operating system 38, a feedback manager 40 and associated audio handler 42 and applications software 44. The command manager 36 also co-operates with the visual handler 46 which in turn drives the display device 50.

The audio handler serves a particular function in providing an auditory feedback mechanism to the user on activation of any key. A pentatonic scaling is preferred, which is the division of one octave into five discrete frequencies. The division is not uniform, rather based on a temporal consideration of what sounds pleasant to the ear. A chording of more than one key results in the reproduction/feedback of the respective notes in combination. Pentatonic scales per se are well known.

The software component of the interface is essentially transparent to the user. The user is concerned only with display presented on the display unit 50 as it relates to the sequential relation of the keys equating or mapping onto the digits of the hand.

Figure 3:
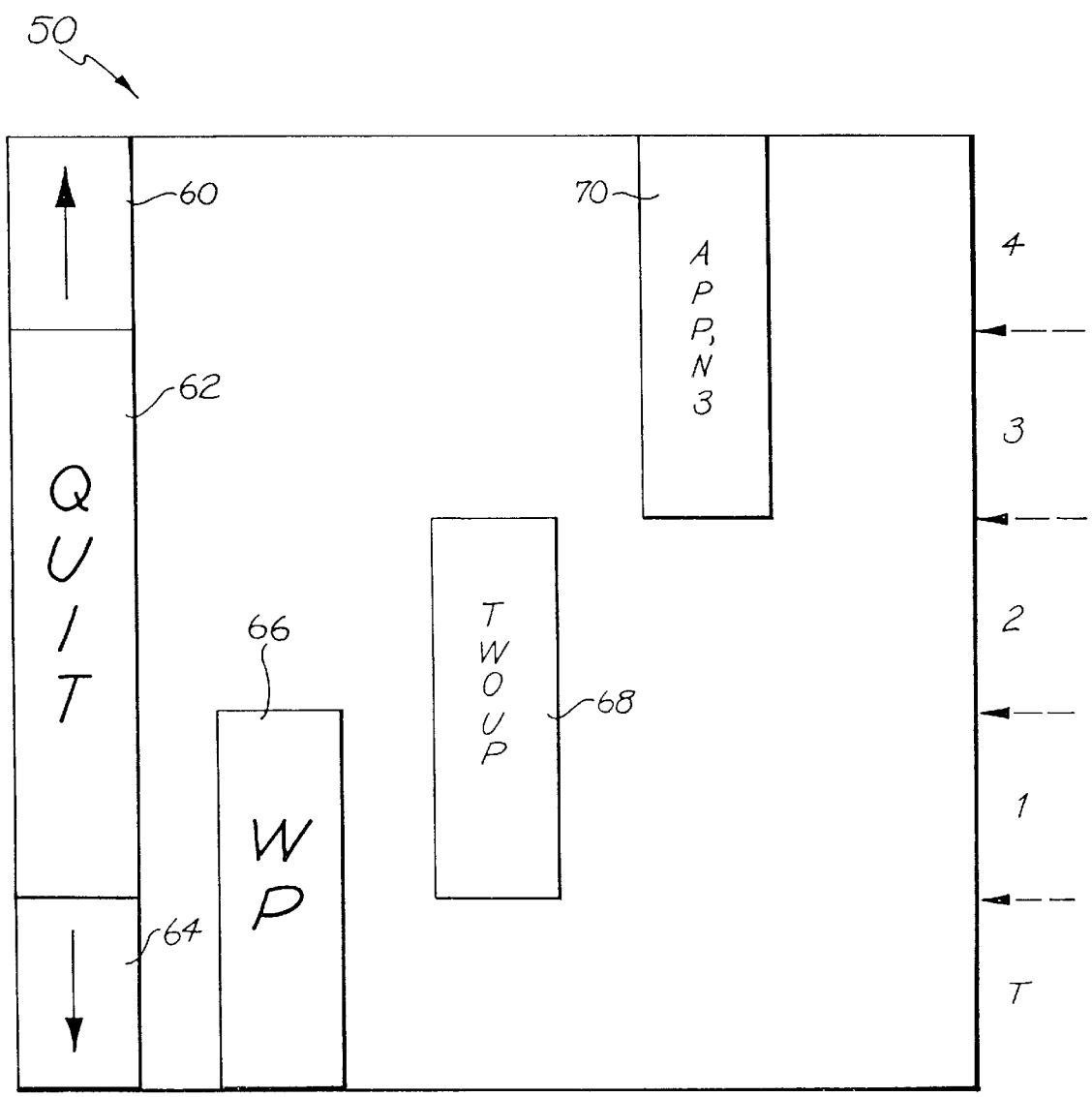
FIG. 3 shows a display presented to the user in use of the man/machine interface.

FIG. 3 shows a display presented on the display device 50. The display, in this instance is notionally (temporally) broken to five non-overlapping regions extending as bands across the display; the panel constituted by the displayed indicia/buttons 60–70 is equivalent in dimension to the whole display. The regions are shown indicated with the nomenclature corresponding to the keys/digits of FIG. 1a and 1b. The processing device is not concerned with the notional partitioning, rather simply retains a page table of currently-displayed indicia indexed by raw chord value and compares the raw chord value input by the user in a look-up routine to give effect to the chorded instruction of data input.

The 'arrow' indicia 60,64 represent commands that can step through operating system levels, whilst the 'QUIT' indicium is a command used to terminate a session. The other three indicia 66–70 represent commands to implement either a word processing package, a "two-up" gaming application or another non-specific applications program.

Each of these regions maps directly onto (equates to) the relative sequential arrangement of the keys on the input device 10. That is, there is one-to-one correspondence of the sequential relation of one or more of the keys with the sequential relation of each indicium. The term sequential has been used, but the one-to-one correspondence in most cases can also be thought of as the spatial relation of the keys or the order of the keys, where that spatial relation or ordering is itself in one-to-one correspondence with the digits. The top-most region corresponds with the position of the little finger key 4, and so on to the bottom and the thumb key T. To give effect to any one of the indicia, the user selects the combination of keys (i.e. the chord) corresponding to the respective indicia. This is assessed by observing which regions are intersected by (overlapped, crossed, covered, extended-over, or coincident with) an indicium.

For example, in order to action the 'QUIT' command, the user activates (chords) the keys "3,2,1" in combination. To give effect to the WP application, the user chords key combination "1 & B". 'TWO UP' is effected by the key combination "2 & 1", and 'APP'N 3' is accessed by the key combination "4 & 3". The user simply identifies which regions are intersected by whichever indicium, then chords what is observed.

In this example, the one panel (i.e. the set of indicia), and hence the five regions, extends over the whole area of the display. It is equally the case that a panel and the associated regions may not extend over the whole area of the display, so long as the relative sequential relation of regions be maintained in one-to-one correspondence with the keys. It is equally applicable to arrange the regions to extend vertically of the display. In that case, the indicia would be horizontally extending. In essence, indicia and regions are orthogonal. It is further possible for the relative position of the thumb to be inverted such that it maps to the top of the screen, and therefore the little finger maps to the bottom of the screen. In view of these possibilities it is convenient to refer to a "thumb origin" to give a sense to the order of the keys to the indicia. In all cases the relative sequential relation between the digits/keys and the regions stays the same regardless of the specific orientation of the input device 10 or the display device 50. As has been previously noted, there may be less than five keys provided. The convention adopted is that the sequence always commences with the thumb, hence an input device with only three keys corresponds to the thumb and index and middle fingers.

Figure 4:
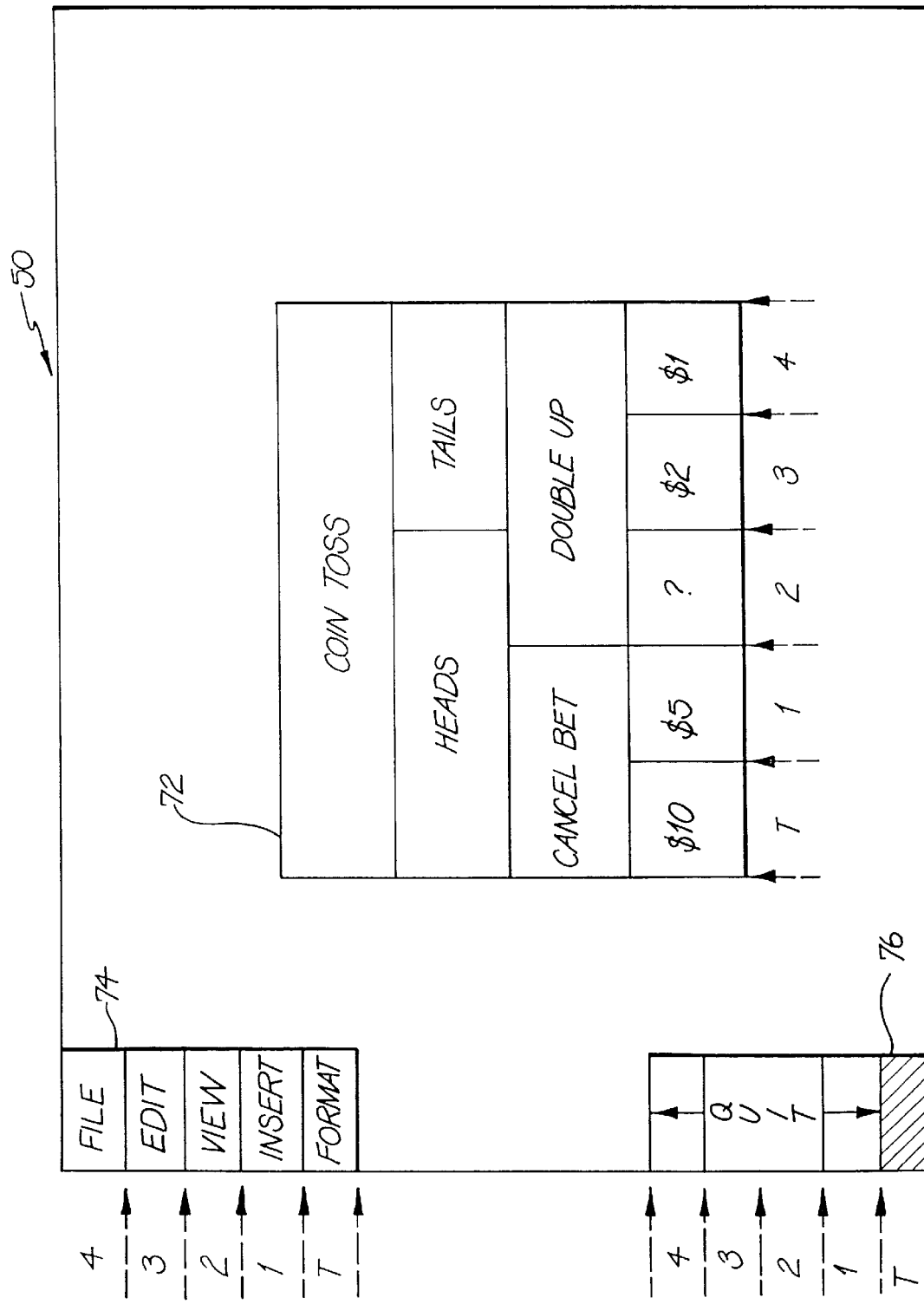
FIG. 4 shows another display.

FIG. 4 shows a subsequent display presented when the 'TWO UP' application program of FIG. 3 is selected. The display contains a panel 72 containing a number of indicia. Each indicium represents a command for use in playing of the 'TWO UP' coin toss game. The panel 72 is notionally divided into five regions, represented in the nomenclature previously indicated. Each of the indicia/buttons in the panel 72 is activated by a unique chord. The $10 button is operated by the "T/B" single key chord, the $5 button by the "1" single key chord, the 'CANCEL BET' button by the "T/B & 1" key chord, and the coin toss button by the chord formed by all the keys (i.e. "T/B& 1 & 2 & 3 & 4 ").

The display also includes a 'hanging-down' panel 74 and a 'hanging-up' panel 76, each notionally partitioned into five regions that are arranged orthogonally to the regions of the other panel 72. These panels relate to specific functions associated with the extra thumb keys A & C, shown in FIG. 1b that correspond to the articulated thumb positions. The extra thumb keys A,C give effect to specific 'shift' functions. The shifted states increase the instruction/data input set from a maximum 31 ($2-1^5$) combinations available with only five keys (T and 1–4).

The C key conveniently has been prescribed a pre-shift function, in that upon activation a shifted state is entered whereupon the subsequent chord takes on a different instruction or data entry value than it would had the C key not been depressed. Considering the example of FIG. 4, upon depression of the key C access is obtained to the hanging-down panel 74, and the five indicia contained therein. In this case, the five indicia each correspond with one region alone. It is, of course, possible to have any of the indicium extending over more than one region.

Another type of shift function is termed 'shift immediate'. This is effected by the A key. This situation is somewhat akin to the shift key to be found on a conventional keyboard, in that the key A forms an alternative to the key B when used alone, and also can be used in combination with the other keys 1–4. The hanging-up panel 76 is accessed by use of the A key in combination with keys 1–4.

Figure 5:
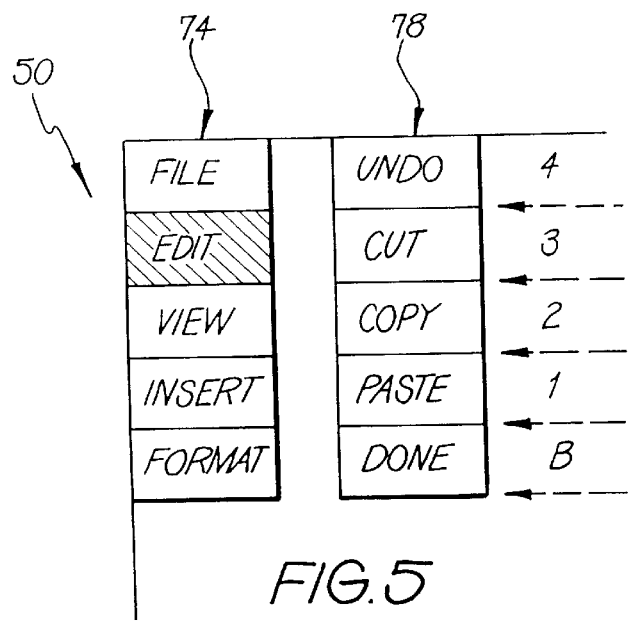
FIG. 5 shows a pull-out display arrangement.

FIG. 5 shows a section of the display of FIG. 4, particularly indicating the hanging-down pre-shift panel 74. Once the pre-shift key C is effected, the subsequent chord will give effect to one of the indicia. In the present example, the subsequent combination is the sequence of "3" key alone (being the EDIT function as highlighted). This results in a further panel 78 being 'pulled-out', and any subsequent chord gives accesses each one of the five indicia indicated in the new panel 78. Again, it is merely for the sake of convenience that the indicia corresponds one-to-one with the five regions.

Figure 6:
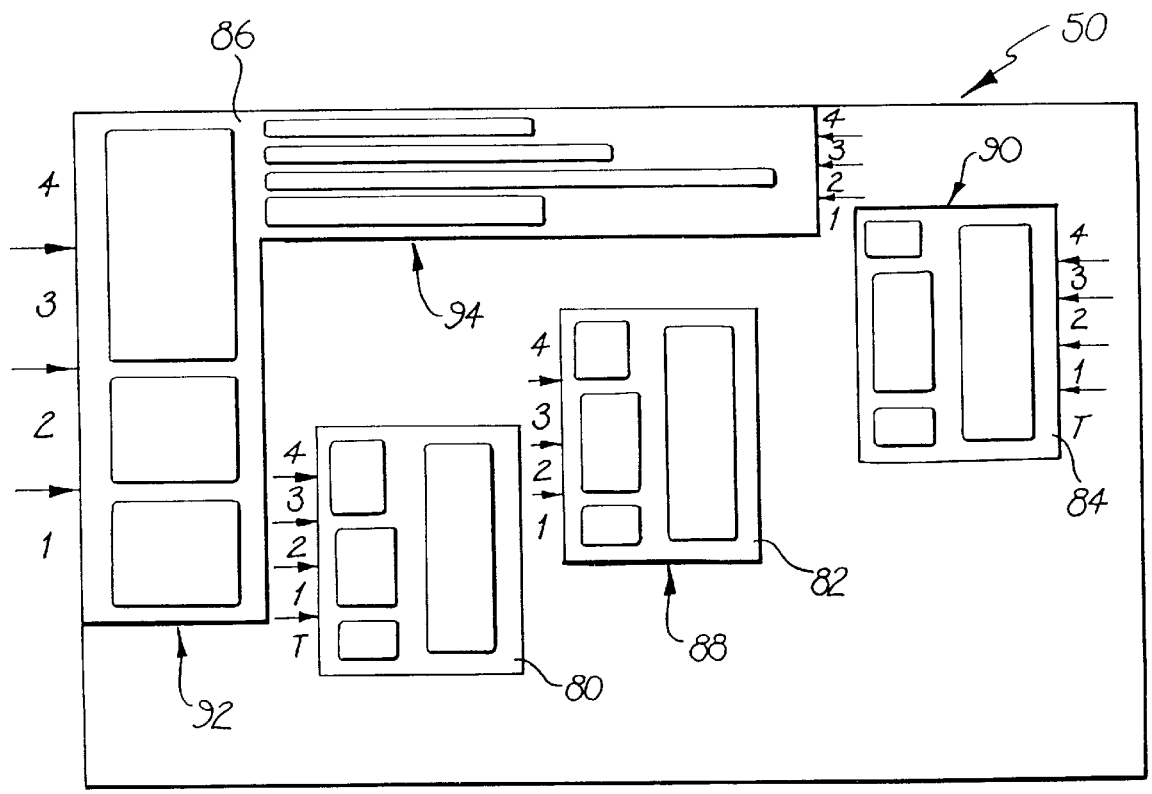
FIG. 6 shows a yet further display illustrating shifted states.

FIG. 6 shows further arrangements for the representation of shifted states. Three 'floating' panels 80,82,84 are shown within the display 50. Each of these panels contains a number of indicia (not labelled), with each panel being notionally divided into five regions, as indicated, that sequentially map onto the keys. The indicia of the panel 80 are accessed without the use of either of the shift keys A,C. The panel 82 includes a 'thumbline' 88 (or 'baseline'), represented by the thickened line to the bottom of the panel. This thumbline 88 provides a visual indication that a shifted state is required in order to access the indicia within the panel 82. The thumbline 88 being at the bottom of the panel indicates the need to depress the A key. In other words, a 'shift immediate' function will be effected as previously described. For the shift immediate function, there will only be four notional regions within the panel, as indicated. This is for reason of the thumb being used to activate the A key to enter the shift immediate state, thus leaving only the remaining four digits to be available for use. There is a certain logic to the thumbline arrangement, in that the thumb must be articulated downwardly away from the usual B key to activate the A key, and its downward sense is consistent with the thumbline 88 being to the bottom of the panel 82. The remaining floating panel 84 has a thumbline 90 located to the top. This indicates the need to articulate the thumb upwardly to operate the C key for a pre-shift state. In the pre-shift state there are five notional regions, as noted.

The display also includes a further panel 86 as an inverted L-shape in the top left hand corner of the display. The 'hanging-down' convention does not apply to this panel 86, rather the thumbline principle is in effect. The panel 86 is shown as a single panel, however contains two discrete sets of notional regions, hence more properly is two panels. The indicia appearing down the left hand side of the display are tied to the thumbline 92 appearing at the bottom edge thereof, and is notionally broken into the notional regions as indicated. Since the thumbline 92 is to the bottom of this part of the panel, it represents use of the A key, in which case there are only four regions as previously described. The indicia extending across the top edge of the display are tied to the other thumbline 94. This thumbline is again to the bottom edge of the panel, hence again represents use of the A key.

Figure 7A:
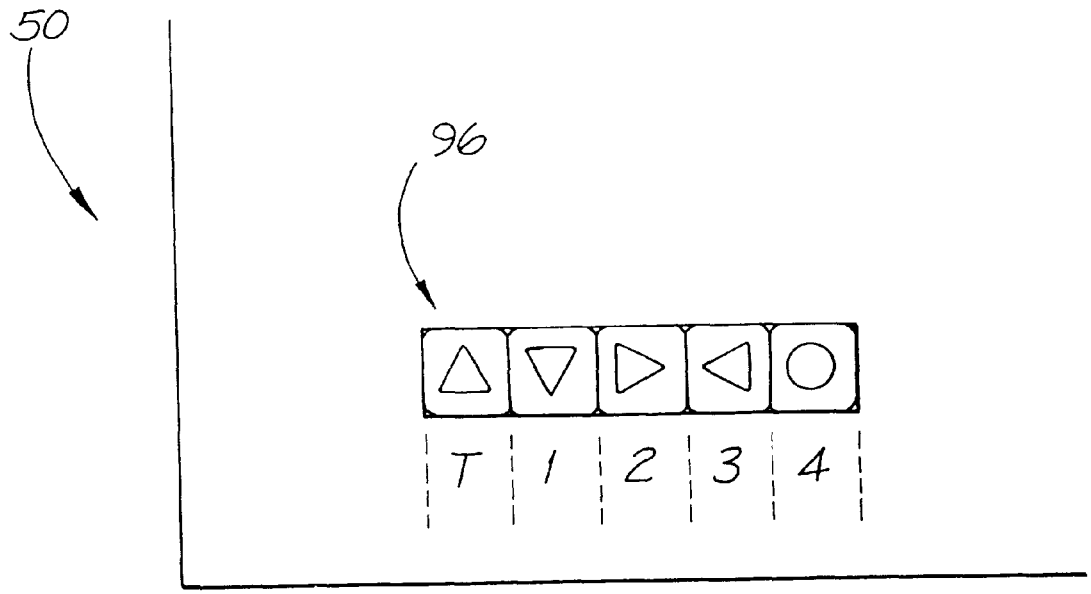
FIGS. 7a and 7b show an example of a pop-up display arrangement.
Figure 7B:
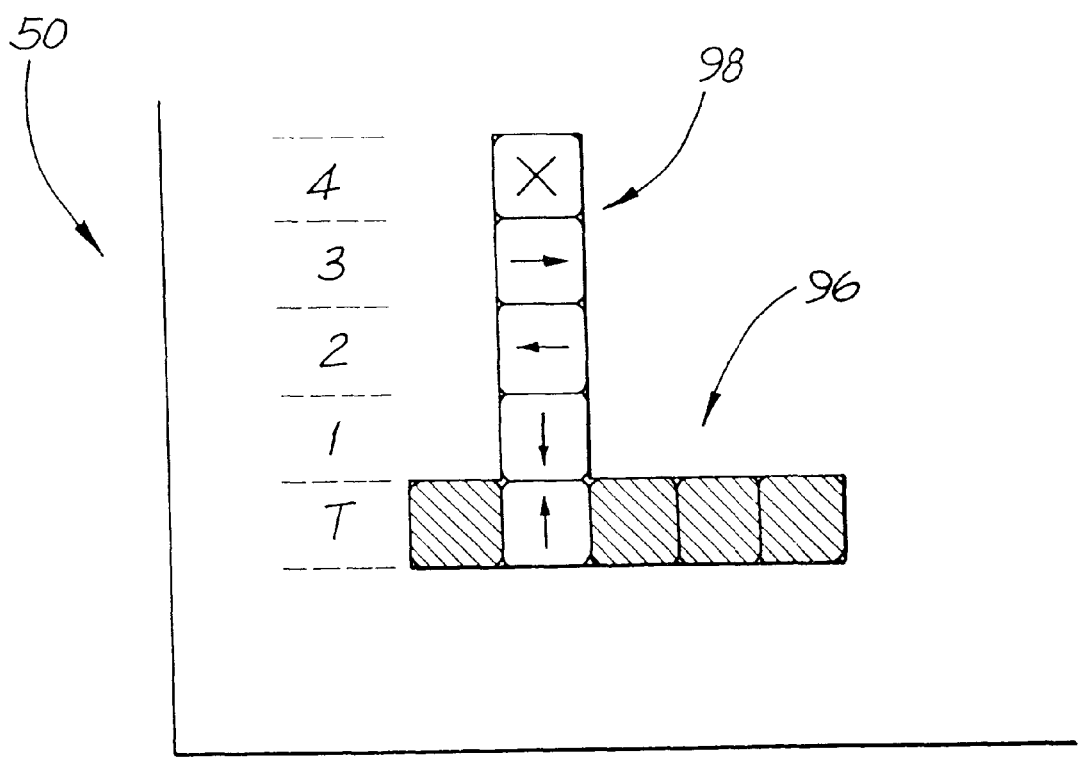

FIG. 7a shows a panel 96 incorporating five indicia. The notional regions corresponding to the keys also shown. If the "1" key is chorded, a further panel 98 pops-up. The further panel 98 contains five different indicia. As can be noted, the regions within the frame are orthogonal to those for the frame corresponding to the parent panel 96. A similar pop-up effect would occur for the other indicia of the first panel 96.

Figures 8A, 8B:
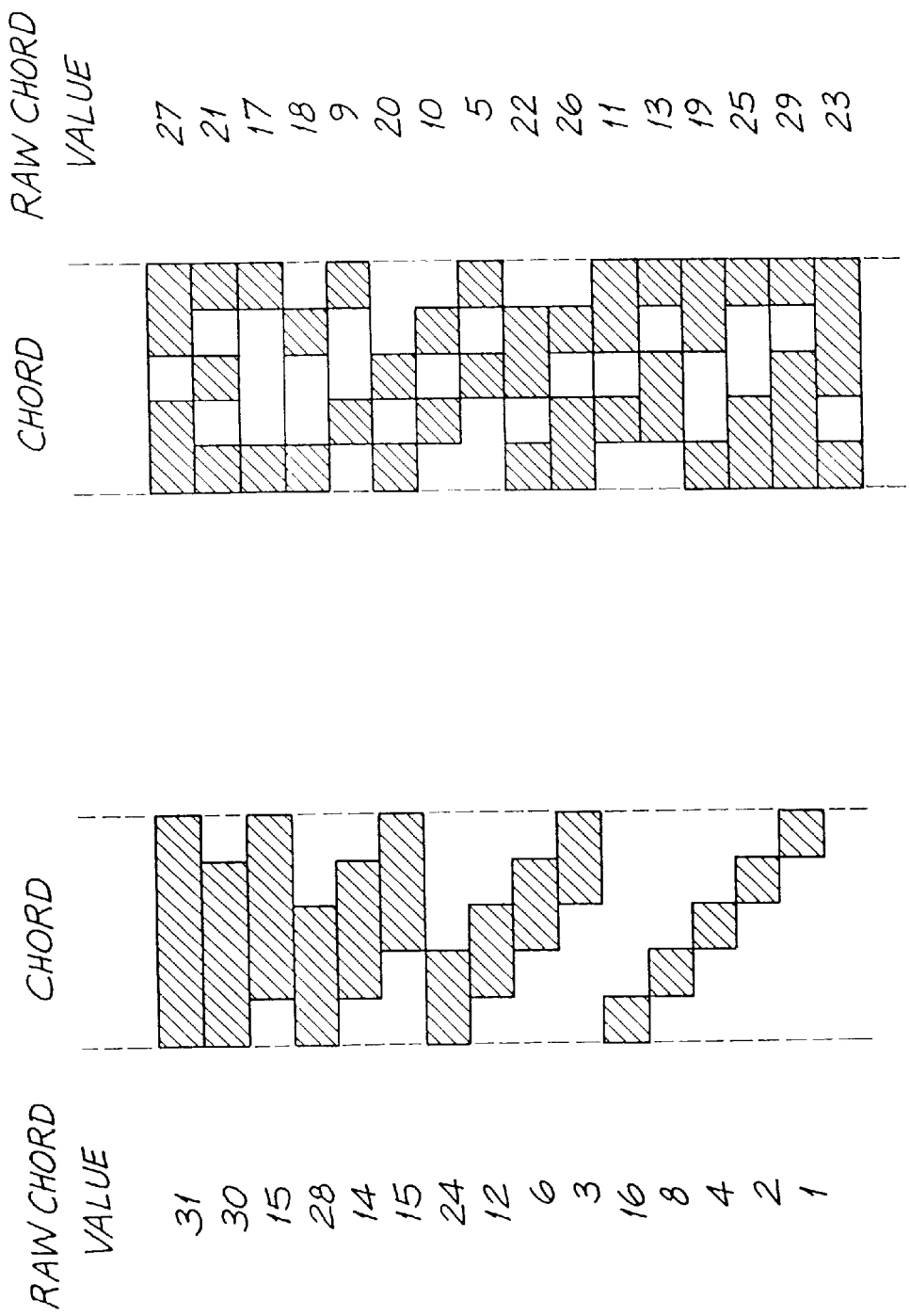
FIGS. 8a, 8b, 8c and 8d show sets of chords for a number of different indicia-representations.

FIGS. 8a and 8b show the complete set (or 'galaxy') of chords for a five-button input device. The dashed lines represent the boundary of five notional regions within which the indicia are bounded. The indicia are shaded, and for convenience are as a type termed "bar chords". Note that a number of the bar chords are not formed by a contiguous key press and these special chords are termed "hollow bar chords". Also shown beside each indicium is its "raw chord value". By a convention, the thumb origin is at the left hand side, and the notional regions are represented in a binary form so that any chord also can be represented as a unique decimal number—this is useful in an implementation of an embodiment of the invention as will become apparent. The binary convention is reversed, increasing from 0–31 from right to left, but equally could be increasing 0–31 from left to right.

Figure 8C:
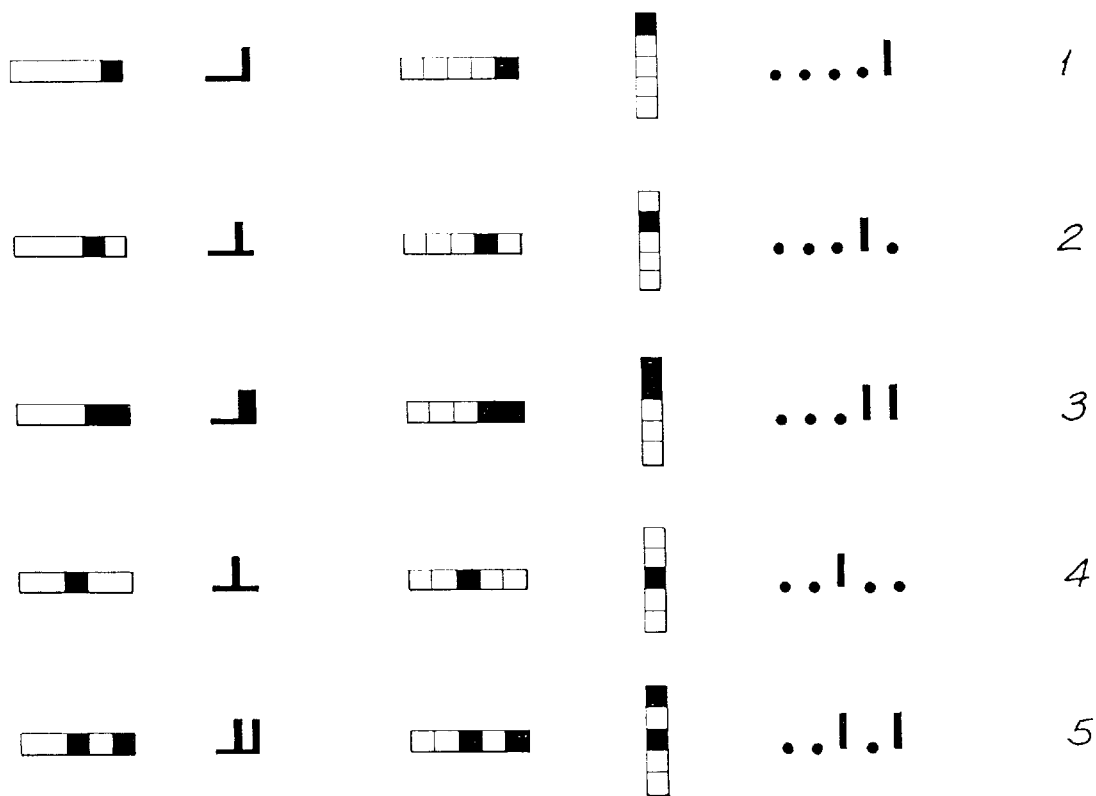

FIG. 8c shows five different style of chord representations, for, as it turns out, the chords having the decimal values 1–5. The first (left-most) column shows bar chords for which the partitioning into five regions has to be visualised without a graphical prompt—compare this with the bar chords in the third column. In the second column, the boundary of the five regions is represented by the bottom horizontal line, and the key(s) to be chorded by the vertical line marks. This representation is termed "glyph chords". The fourth column represents the vertical, rather than horizontal orientation of bar chords, with the thumb origin occurring at the bottom. The fifth column representation of dots and line marks are termed "dot chords".

Figure 8D:
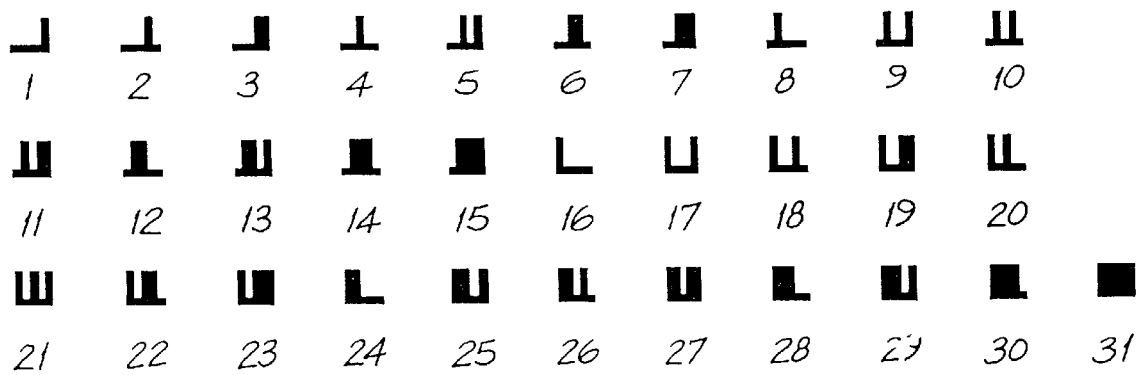

FIG. 8d shows the galaxy of glyph chords together with their raw chord value.

Figure 9:
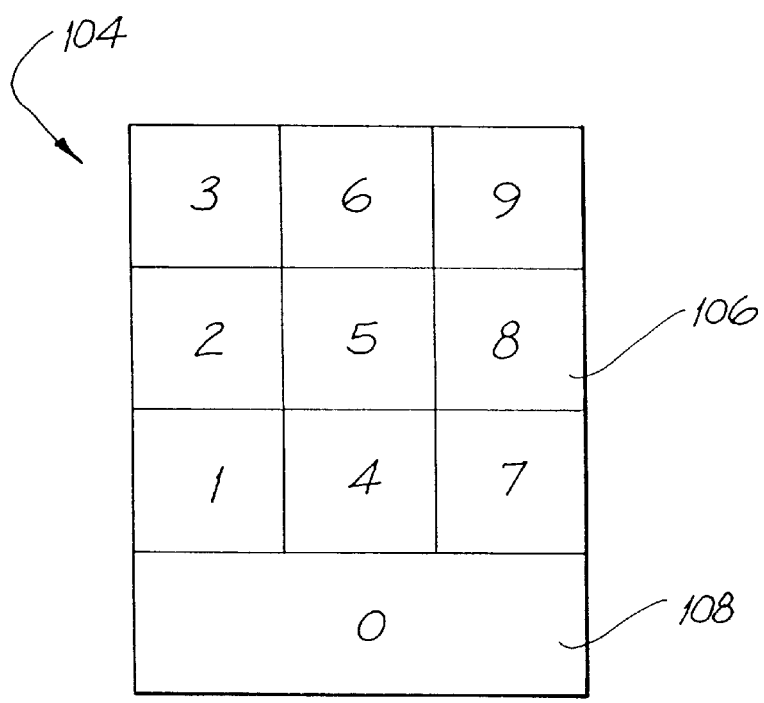
FIG. 9 shows an arrangement for a numerical pad.

FIG. 9 shows a panel 104 in the form of a numeric keypad. All of the digits 0–9 are represented. The thumb origin is in the bottom left hand corner of the "1" indicium. The panel 104 is broken up into two parts, the first part being the 3×3 array 106 of the numerals 1–9, and the second part being the button 108 for the 0 numeral. The "0" button is activated by chording "T & 1 & 2". The other numerals are accessed by means of chording a "couplet". That is, in the 3×3 array each particular numeral button requires a separate sequential combination of two chords for it to be accessed. For example, the "1" button is accessed by the couplet "T" & "T", whilst the "6" button is accessed by the couplet "1" & "3". Couplet chording is somewhat equivalent to the pop-up menus previously discussed, in as much as the popped-up buttons are always displayed rather than being hidden.

Figure 10:
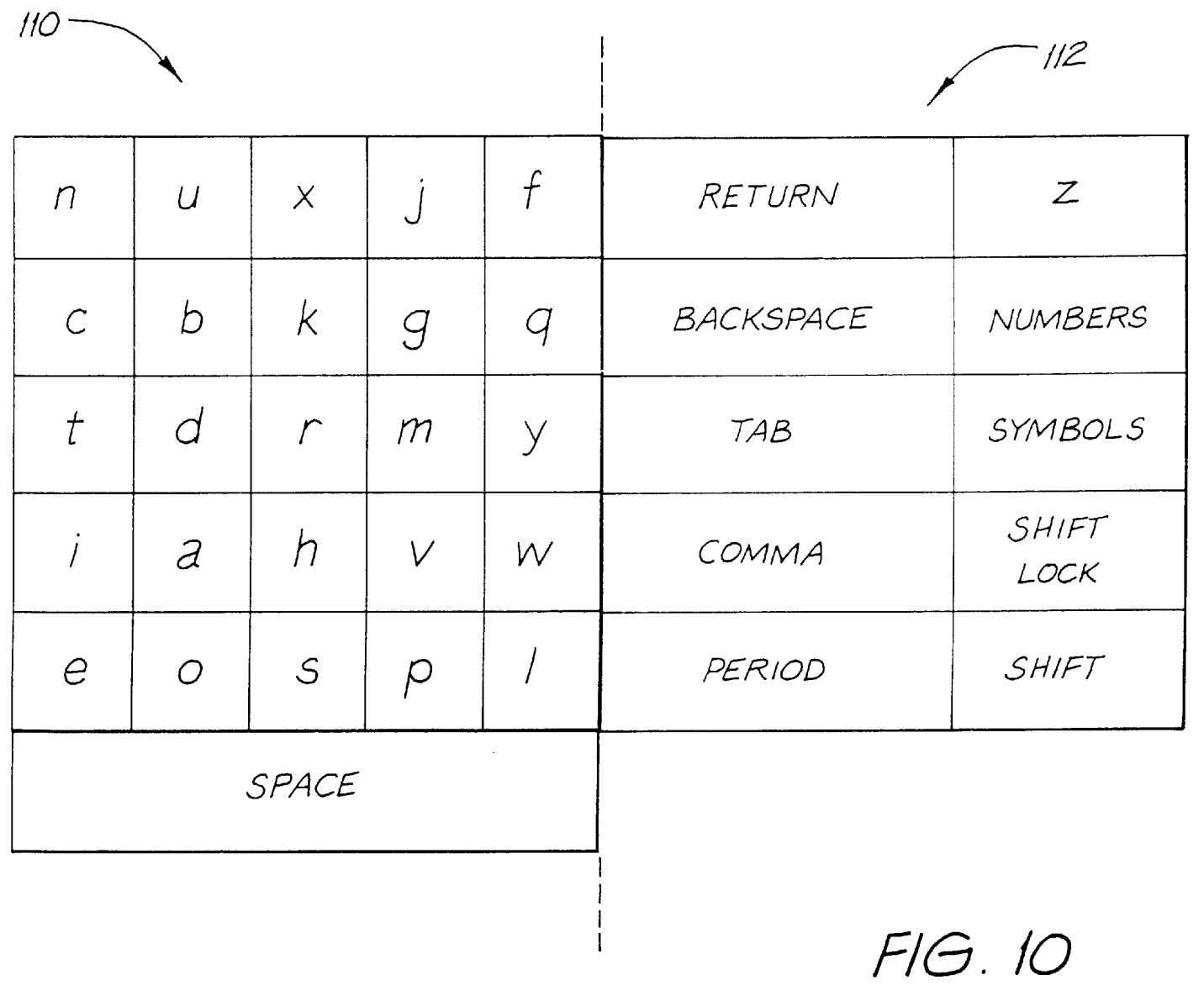

FIG. 10 shows a form of virtual typewriter, basically comprising two panels 110,112 side-by-side. The partition between the panels is represented by the vertical-line. The panel 110 comprises a 5×5 array of 25 buttons representing 25 letters of the roman alphabet. Activation of the respective letter buttons is by couplet chording. The thumb origin for the panel 110 is at the bottom left hand corner of the "e" button.

By way of example, the letter "r" button is activated by chording "2" & "2", and the "j" button is activated by chording "3" & "4". The "Space" button is activated by chording "T & 1 & 2 & 3 & 4". The spatial arrangement of the letter buttons contemplates the relative frequency of occurrence of letters in the English language and maps that frequency onto the dexterity of the thumb and fingers. Thus, the vowels a,e,i, and o are accessed by combinations of the thumb and first finger that are the most dexterous digits.

The panel 112 compliments the typical word processing functions. The thumb origin for the panel 112 is at the bottom left hand corner of the "Period" button. This panel also operates on the basis of couplet chording. Thus the "Tab" button is accessed by the chord "T & 1 & 2" & "2". The "Shift" button is accessed by the chord "3 & 4" & "T". The "Numbers" and "Symbols" buttons are in the nature of pop-out menus giving access to, respectively, a numerical panel such as the panel 104 shown in FIG. 9 and other couplet panel arrays in respect of symbol sets.

It will be noted that each of the couplet chords contained within both of the panels 110,112 is unique from any other.

The right-hand panel could be chorded by the user's other hand if a second input device were provided. The arrangement shown in FIG. 10 is well suited for word processing functions, and can enable touch typing much in the manner of a conventional qwerty keyboard with a minimum of tuition.

Figure 11:
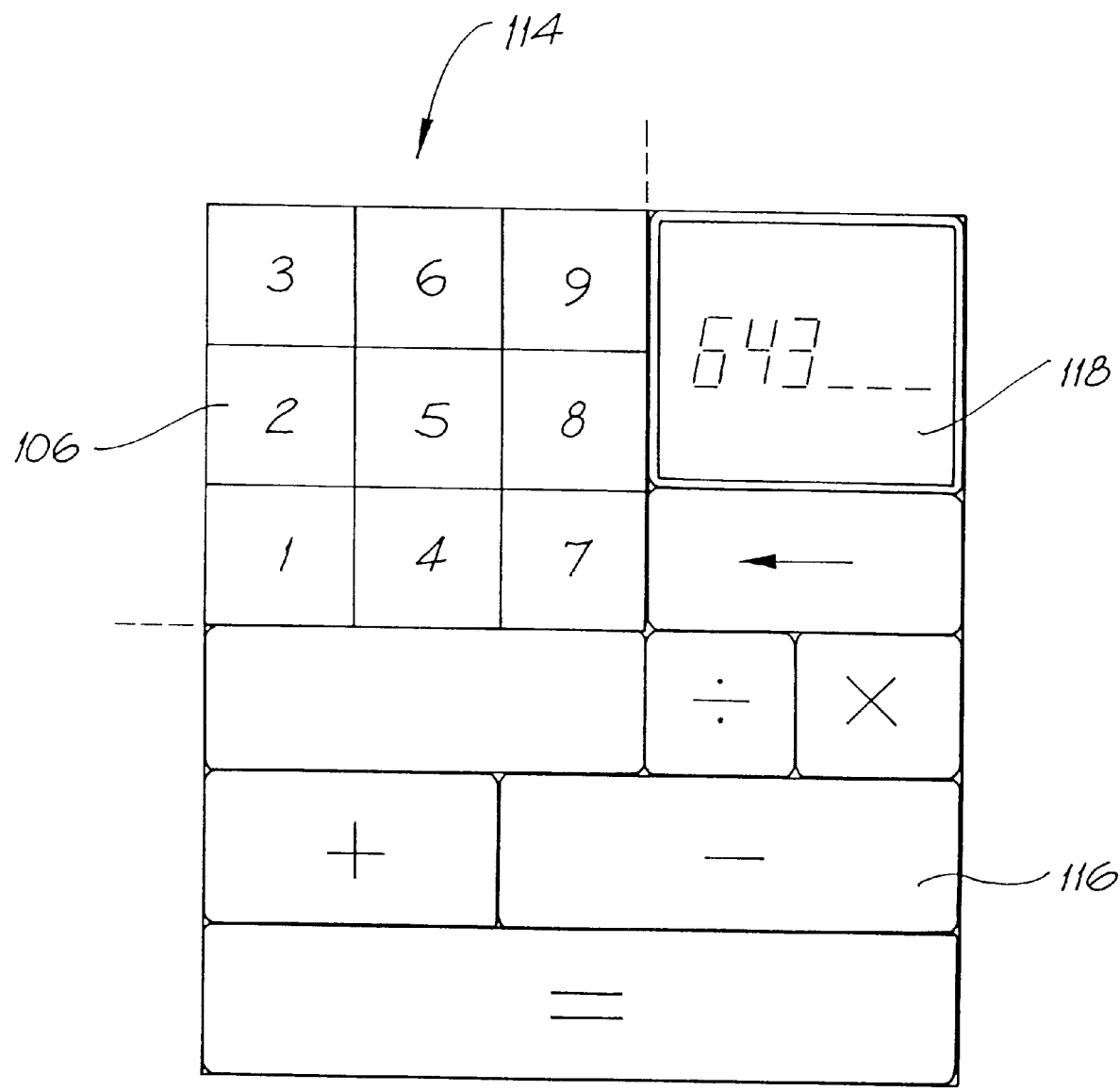
FIG. 11 shows a virtual calculator.

FIG. 11 shows a form of a virtual calculator 114. The calculator comprises a 3×3 couplet pad array 106 (as previously shown in FIG. 9), for which the thumb origin is at the lower left hand corner of the "1" button. The calculator 114 also comprises a number of single cord buttons delineated from the couplet pad array 106 as shown by the dashed lines. The thumb origin for the chord buttons is the left hand side of the panel 116. The top window 118 represents an inner display to indicate the function of the calculator 114 much in the nature of a conventional hand-held calculator. The single chord required to activate any of the function buttons or "0" button are independent of the first chord of any couplet pertaining to the buttons within the pad array 106. By way of example, the number 643 is chorded by the sequence "1" & "2", "1" & "T" and "T" & "2". This number can be operated on, say to be multiplied by 2 by the successing chords: "4" then "T" & "1" then "T & 1 & 2 & 3 & 4".

Figure 12:
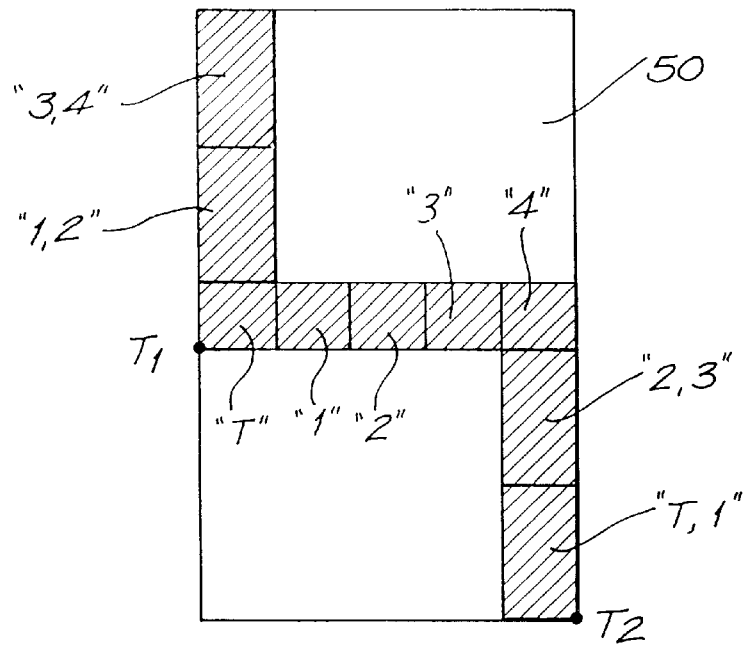
FIG. 12 shows a further display of cross panels.

FIG. 12 shows a display arrangement termed cross-chords. The thumb origin for the shaded buttons extending in the upper half of the display along the left hand side and horizontally across the mid-point of the display is illustrated as $T_1$. The thumb origin for the buttons arranged on the right hand side of the lower half of the display 50 is shown as $T_2$. FIG. 12 also shows the chord required to activate each button, from which it can be seen that each chord is mutually exclusive from any other.

Figure 13:
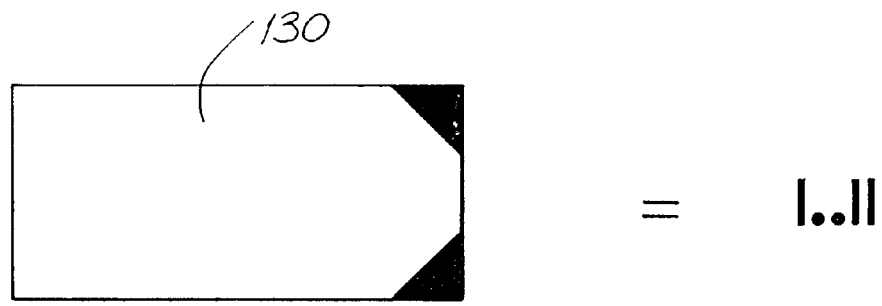
FIGS. 13, 14, 15a, 15b, 16a and 16b show yet further chord arrangements.

FIG. 13 shows an alternative representation of an indicium 130. The convention in this case is that because only the four vertices of the rectangular box are displayed, then the thumb always forms a part of the chord. Accepting the further convention of the bottom left-hand vertice being the origin, then the chord would be formed by the combination "T & 3 & 4". The dot chord representation also is shown.

Figure 14:
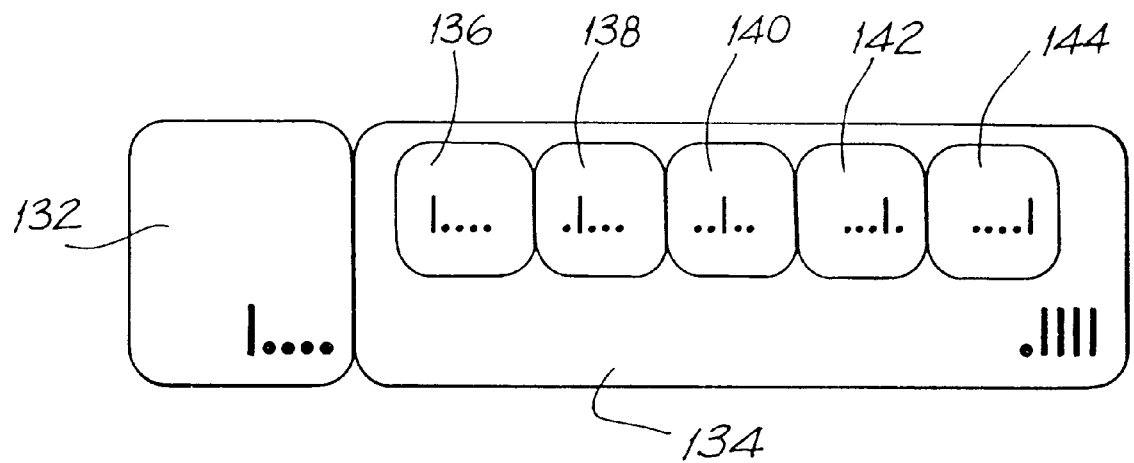

FIG. 14 shows an example of the combination of two indicia 132,134 forming bar chords and couplets. The two possible bar chords have their dot chord value superimposed on them, and respectively are formed by "T" and "1 & 2 & 3 & 4". The second indicium 134 also can be utilised in the form of a couplet in conjunction with the indicia 136–144 for the five bar chords superimposed on it. Note too that the dot chord representation corresponding to each chord has been shown. To activate the middle indicium 140 on the background indicium 134, the couplet chording sequence is "1 & 2 & 3 & 4" and "3".

Figure 15A:
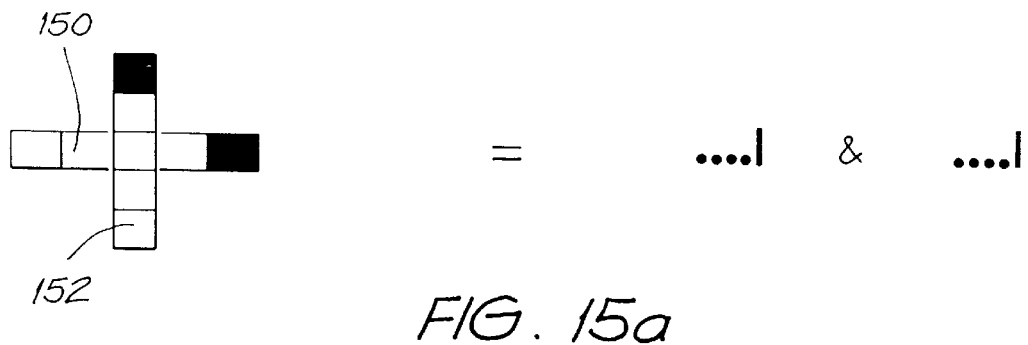
Figure 15B:
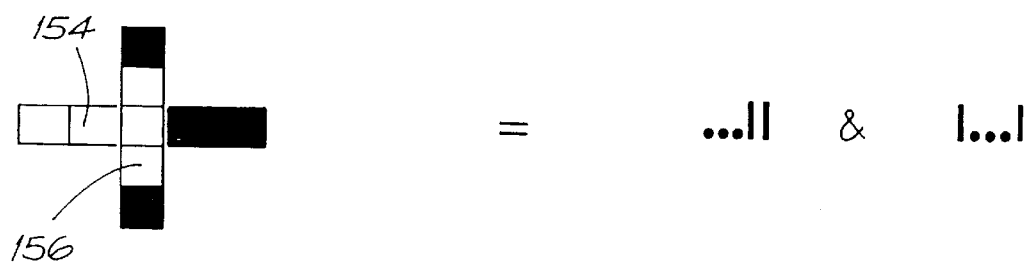

FIGS. 15a and 15b show an alternative representation for couplet chording for a number of indicia 150–156. Also shown is the corresponding dot chord representation. The convention adopted is that horizontal takes precedence over vertical, thus in the case of FIG. 15a leading to the couplet "4" and "4", and for FIG. 15b "3 & 4" and "T & 4".

Figures 16A, 16B:
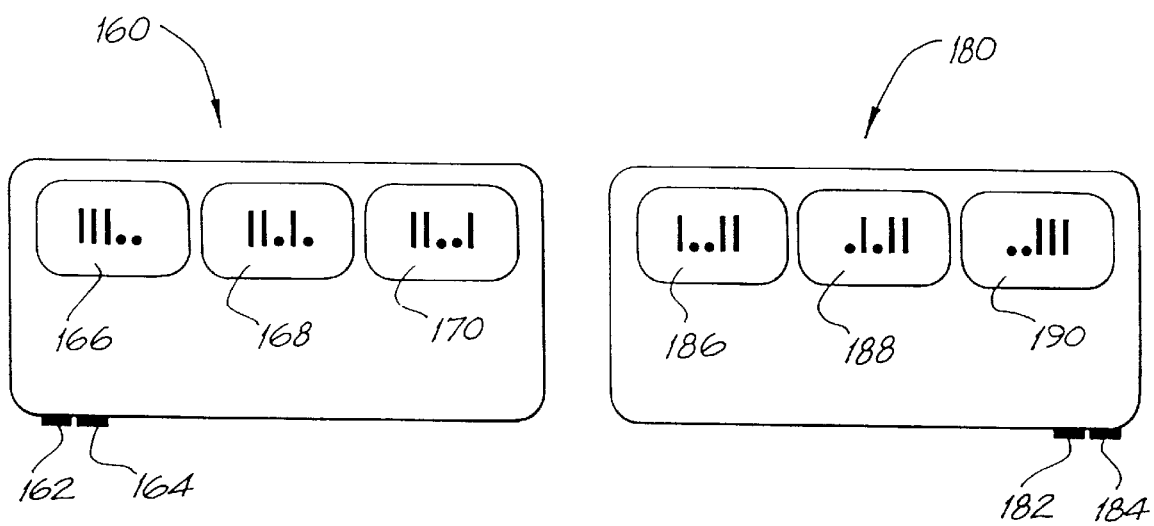

FIG. 16a shows an abbreviated form of an indicium 160 representing three bar chords. The two tabs 162,164 located along the bottom edge of the indicium 160 indicate that "T & 1" are required to access any one of the three superimposed sub-indicia 166–170. The dot chord representation for those three sub-indicia 166–170 also are shown. In FIG. 16b, the tabs 182, 184 are located to the right hand side of the indicium 180, indicating the keys "3 & 4" are required as well as the corresponding key of the superimposed sub-indicia 186–190 to effect a chord.

A library of conventions can be chosen, and as follows from the example presented herein, it is apparent that the left hand side and/or bottom of an indicium represents the thumb origin. The thumb is always the starting point—this is particularly important if less than five keys are provided. Horizontal takes precedence over vertical as does clockwise over anticlockwise. All indicium must satisfy the rule that they are resolvable into a 'press path'.

Embodiments of the present invention have immediate application in relation to conventionally-understood computing devices, but equally could be incorporated into viewfinder control systems (e.g. camcorders), autotellers, fax and photocopy machines, embedded interfaces (e.g. vending machine maintenance interfaces), mobile telephones and pagers, portable machinery (e.g. service equipment), video and television remote controllers, interactive television controllers, personal stereos, household appliances (e.g. clock radios), vehicleonics (e.g. air conditioning, cruise control, stereo, cabin controls, etc.), powertool interfaces (e.g. pistol grip-style drills) control mounted (e.g. steering wheel or joystick), game and toy interfaces, electronic slate-style magazines, pocket organisers, hand-held computing devices, notebook and pen computers.

A particular advantage accrues by virtue of the present invention in that the indicia can be easily scaled and yet retain the information content thereof. This is in contrast conventional windowing-type systems, where icons, if they were able to be shrunk, would lose their information content, and also would become difficult to access by means of a pointing device. Indeed, prior art windowing systems do not have provision for the scaling of a "window" or icons within a window, rather simply collapse the window itself. By the use of indicia in accordance with the present invention, no such pointing is required, rather the information content will be retained so long as the eye can resolve an indicium, of course depending also upon the pixel resolution of the display device. This means that a greater number of indicia can be included on a display than for the conventional windowing systems.

Figure 17A:
FIGS. 17a–17c show a segmenting cursor arrangement.
Figure 17B:
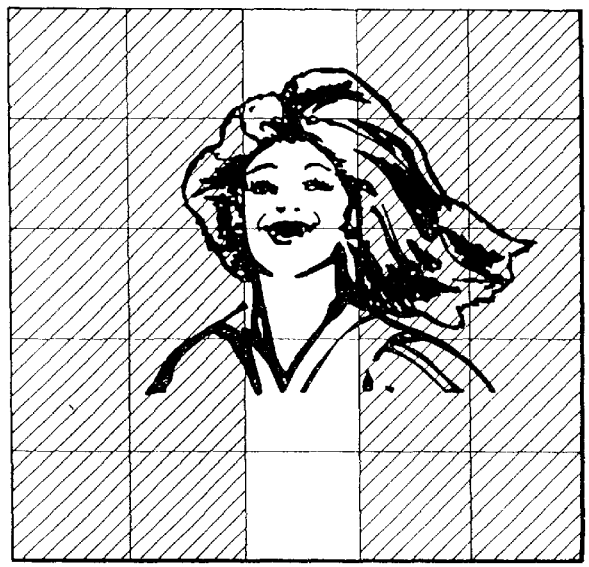
Figure 17C:
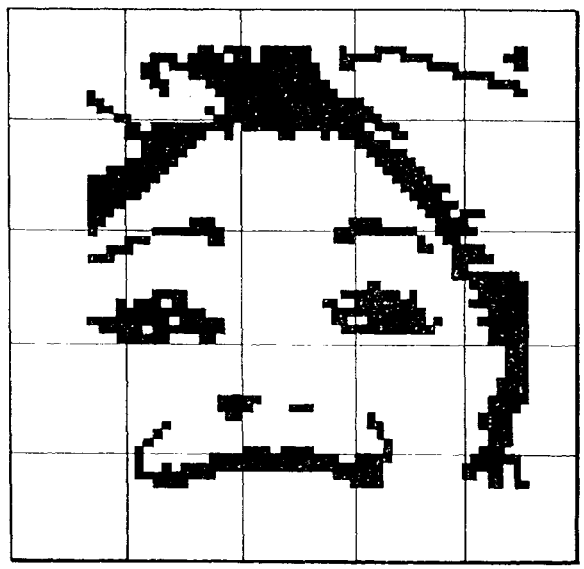

FIGS. 17a–17c show a display on which a pictorial representation, in this case being of a woman, is shown. The display equally could be of a map or an integrated circuit layout, for example. The display 50 shows the 5×5 array of regions occupying the whole of the display. Utilising the couplet chording principle discussed earlier, a segmenting cursor or "zoom" function can be achieved.

The thumb origin is located at the bottom left hand corner of the display 50, and in the examples shown, the first chord of the couplet is "2" that results in the highlighted representation shown in FIG. 17b. On activation of the other half of the couplet chord "3", that particular chorded button is exploded and occupies the whole of the display 50 as shown in FIG. 17c. By further couplet chording, yet greater resolved detail can be obtained.

Figure 18A:
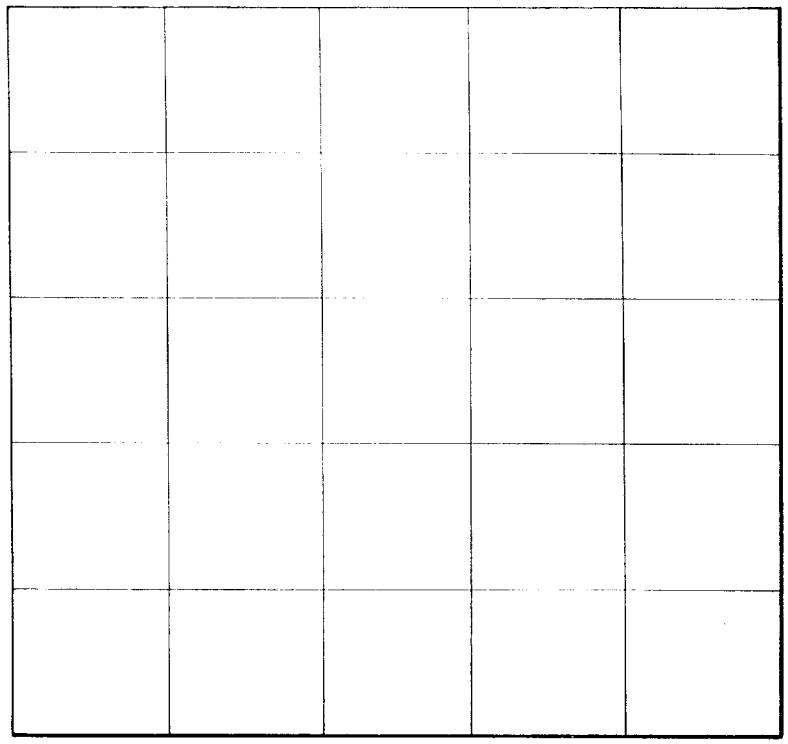
FIGS. 18a and 18b show a segmenting pointer arrangement.
Figure 18B:
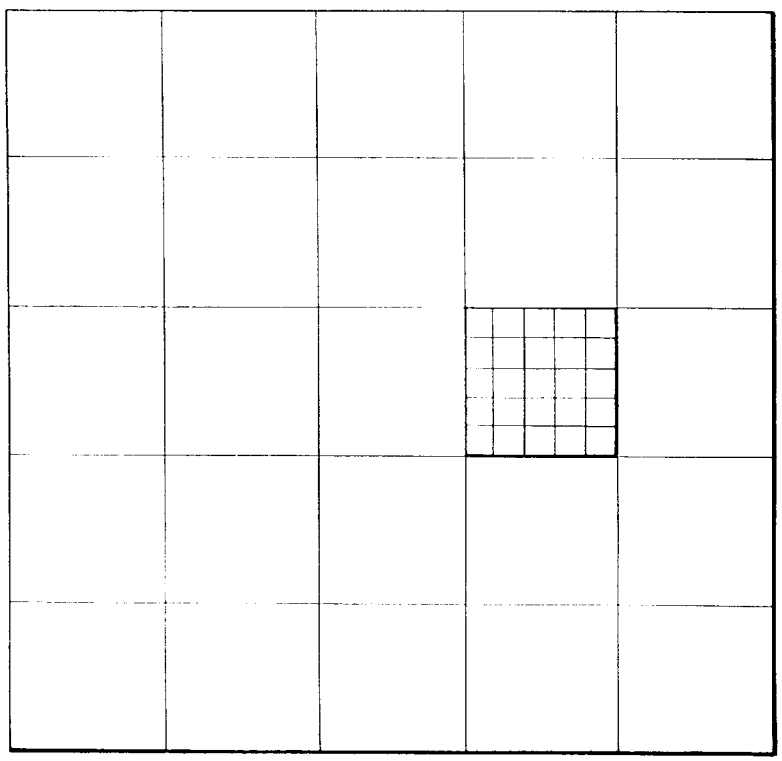

FIGS. 18a and 18b show a variation of a segmented display, being a pointing function. By keying the couplet chord "3" & "2", that particular button has a further segmented array superimposed on it. A further chorded couplet can yet further divide one of the buttons within the highlighted button to point more specifically resolved on an object displayed.

Figure 19:
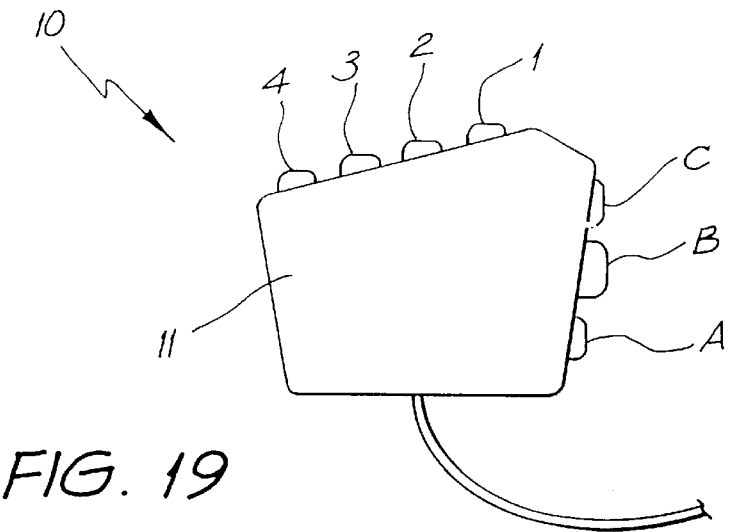
FIG. 19 shows the mechanical arrangement of an input device.

FIG. 19 shows a mechanical arrangement for the input device 10. The body 11 is sized to fit into the palm of the hand of a user, and in the configuration shown is suited to use by the left hand. The thumb therefore wraps around the side of the body 11 whilst the four fingers wrap across the top. The digits therefore can activate the keys in a manner previously described. Such an arrangement provides the advantage of being useable in a mobile configuration. The body 11 is securely grasped in the palm of the hand, and the digits do not have to move other than in a gross closing motion to activate the keys. The configuration shown is easily adapted for use by the right hand simply by flipping it over, therefore is completely ambidextrous.

Figure 20A:
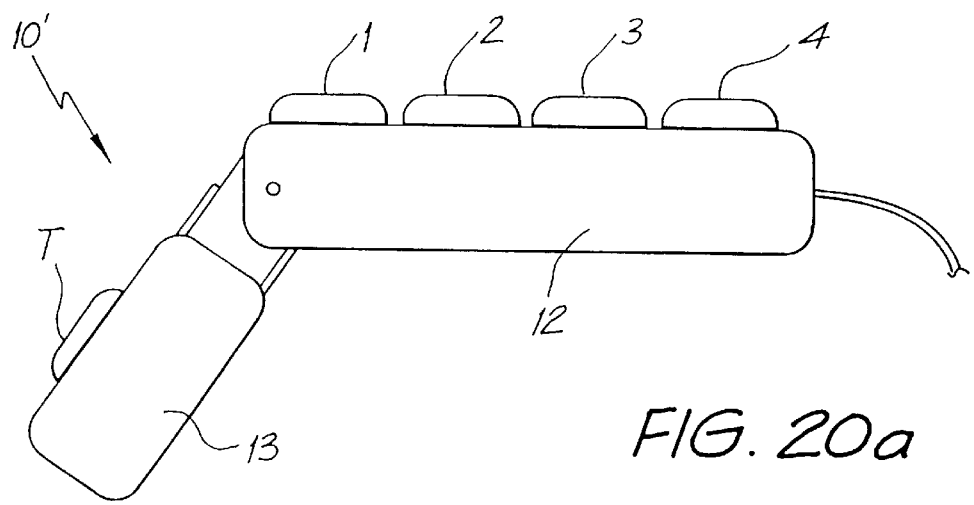
FIGS. 20a and 20b show the mechanical arrangement of a further input device.
Figure 20B:
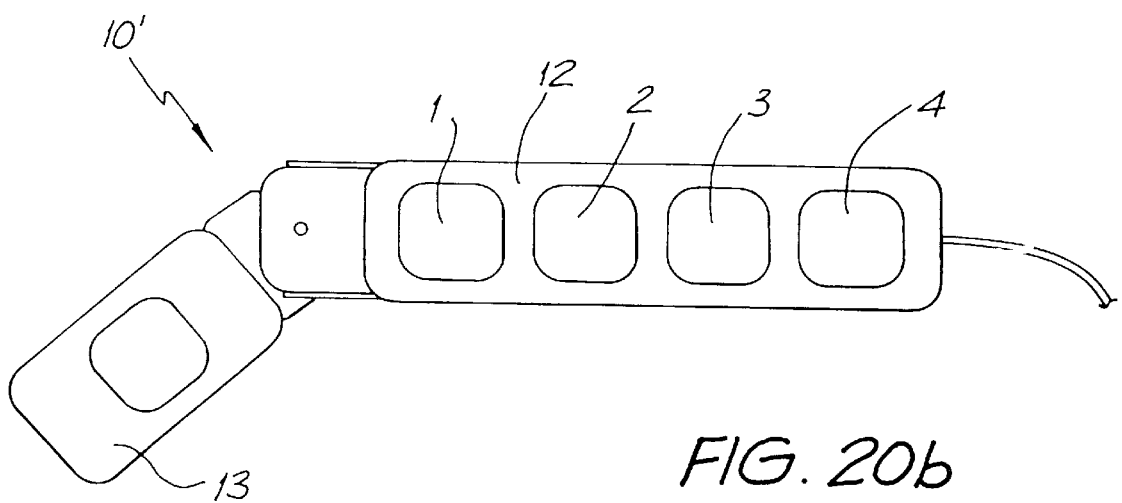

FIGS. 20a and 20b show an alternative arrangement for an input device 10'. The hand-held device 10' comprises two body portions 12,13 hingedly connected together. The arrangement of the keys with respect to each of the body parts 12,13 is shown.

The particular advantage of this configuration is that it is ambidextrous, and also can be used either in the manner shown for the controller 10 of FIG. 19 when grasped in the palm of the hand, in which case the respective body parts 12,13 are arranged at an acute angle to each other, or with the body parts in a common plane for use as an on-bench keyboard.

Figure 21:
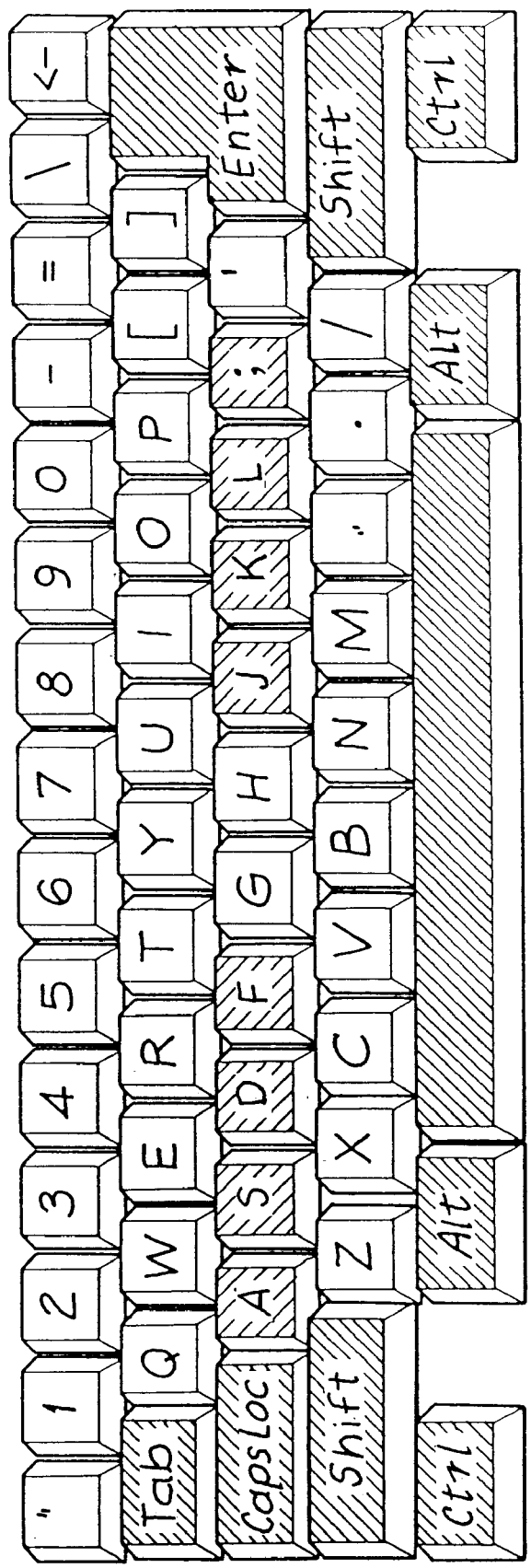
FIG. 21 shows a conventional qwerty keyboard layout.

FIG. 21 shows a conventional qwerty keyboard layout. A further embodiment of the invention provides for combined chording/qwerty operation by means of such a conventional qwerty keyboard. Thus the keyboard shown in FIG. 21 can be operated in the usual manner, however the software resident on the associated processing device can recognise when chords are keyed in distinction to single key presses for conventional inputs. In the embodiment, the "home" keys and the space bar are used as the keys for chording operation. If the right hand is being used for chording, then the sequence of qwerty keyboard keys corresponding to the sequence of the digits commencing with the thumb is: "space bar, J,K,L,;". If the left hand is being used for chording, then the chording keys are: "space bar, F,D,S,A". In operation of software embodying this concept, the display presented to the user can be, say, a conventional word processing package, with superimposed chording indicia. The only restriction is that the so-called "singleton" chords (i.e. the single digit presses) that are excluded.

Figure 22:
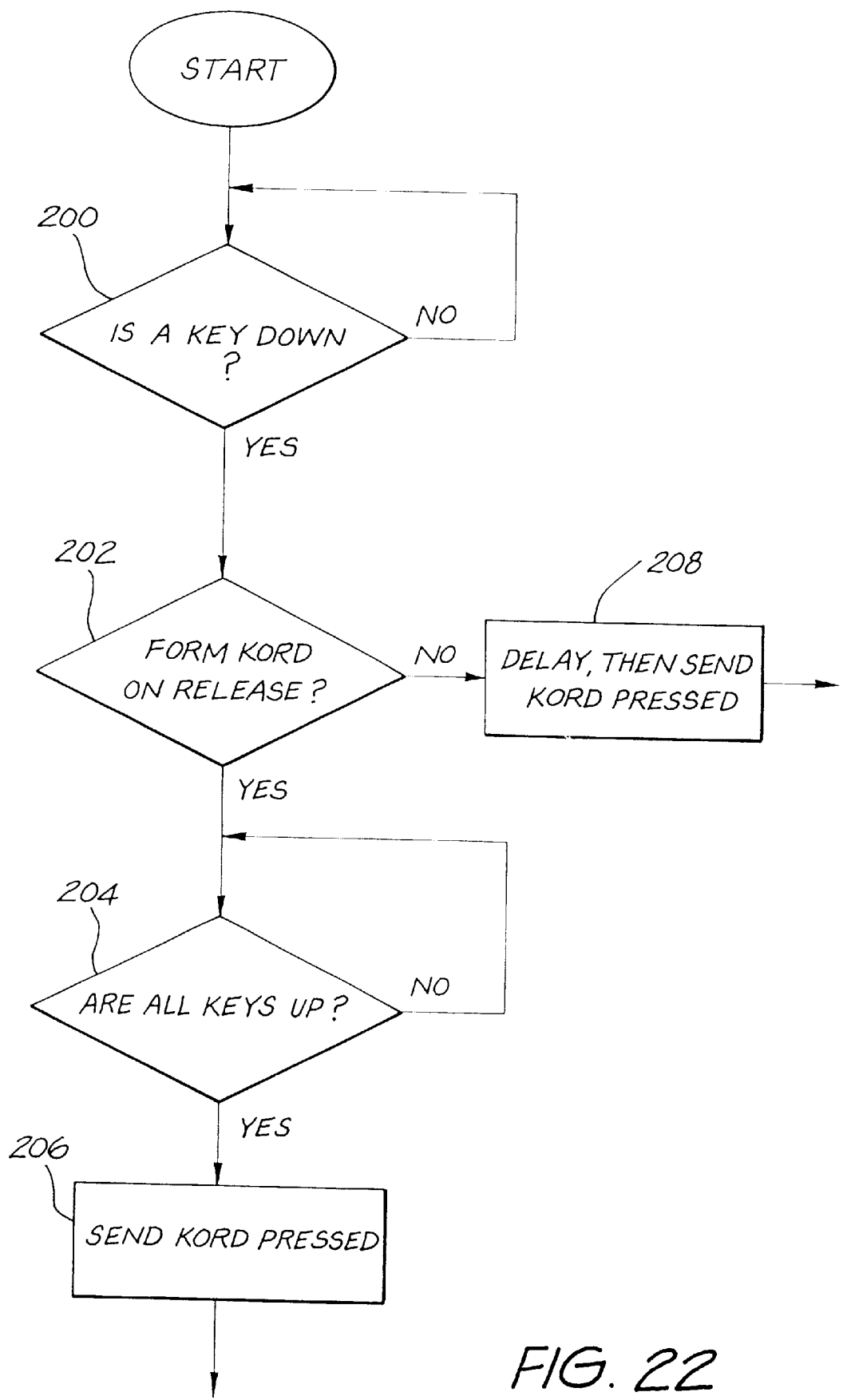
FIGS. 22 to 24 are flow diagrams supporting the methodology of embodiments of the invention.
Figure 23:
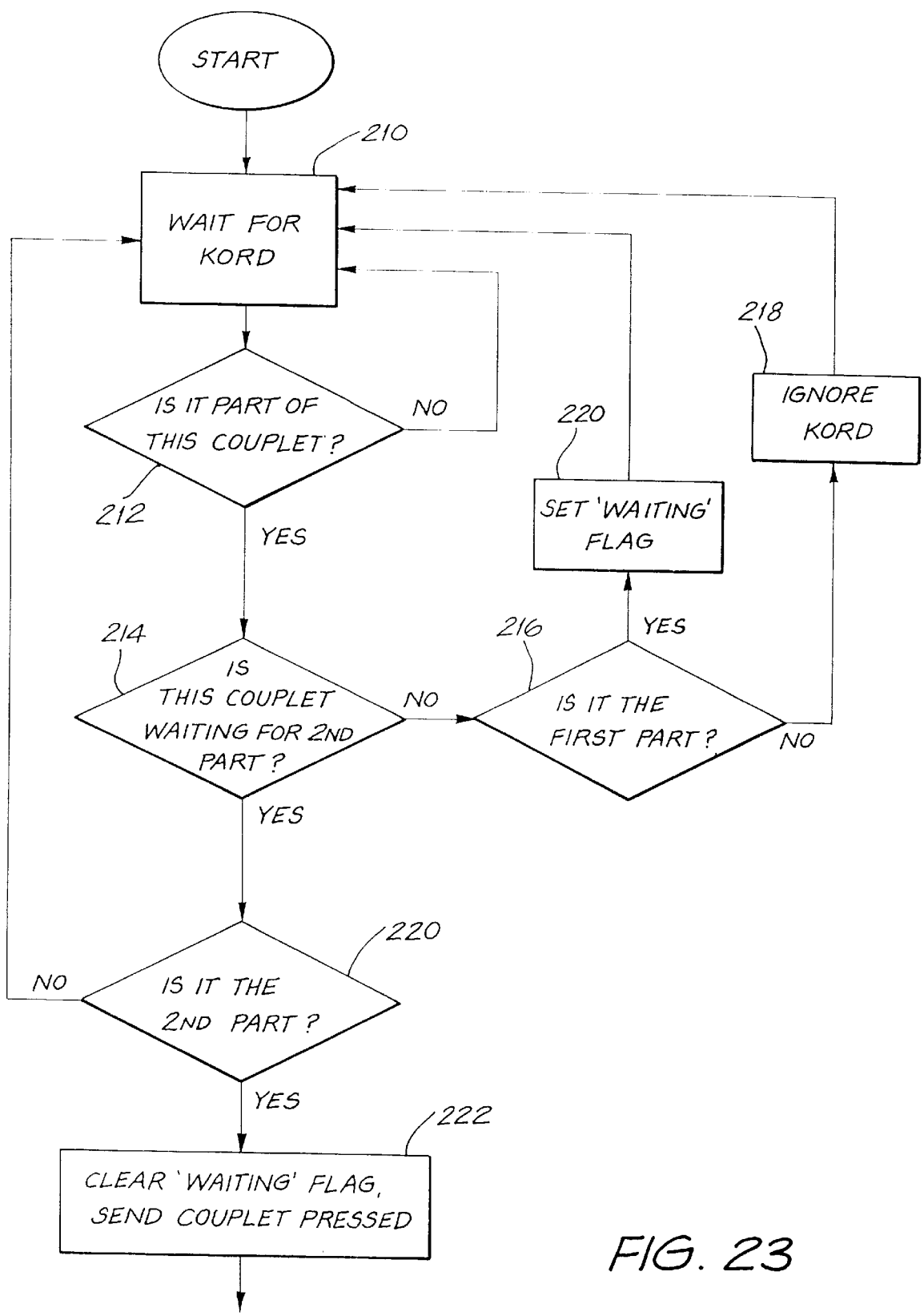
Figure 24:
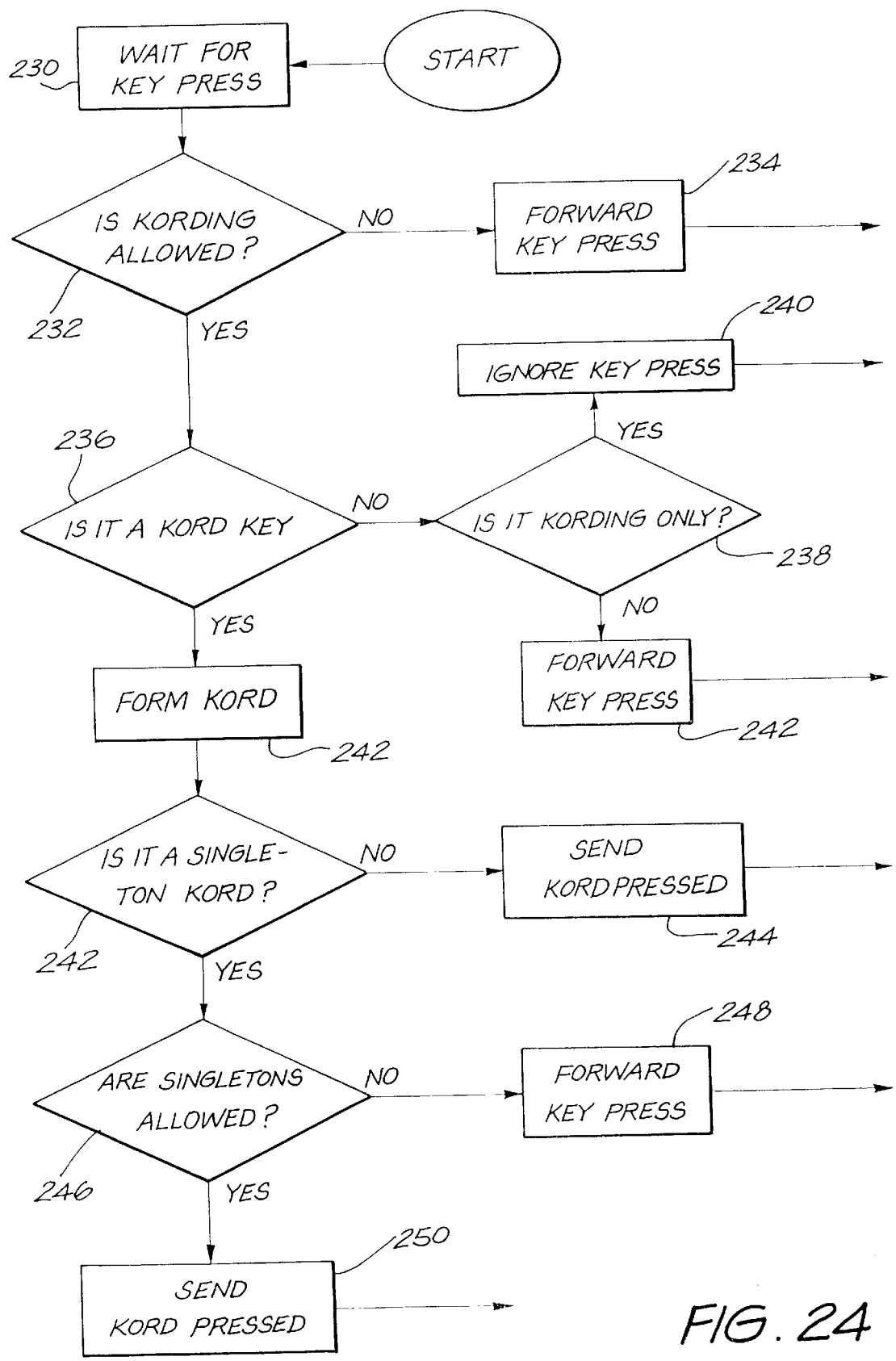

It would be readily apparent to one skilled in programming arts how to write code to implement the embodiments of the invention hereinbefore described without the exercise of any inventive faculty. In this connection FIGS. 22 to 24 are included that respectively are flow diagrams of the chording methodology, the couplet methodology and the chord/qwerty methodology. In FIG. 22 step 200 detects a key press. If, in step 202, a chord is to be formed on release, then step 204 checks to determine whether all the keys are depressed, and if so step 206 sends the value of the chord keyed. If the chord is not to be formed on release, step 208 delays sending of the chord keyed.

FIG. 23 concerns the extension of FIG. 22 to the forming of couplets. Step 210 represents waiting for a chord press, and once such is received, step 212 determines whether the chord pressed is part of the present couplet. If not, there is a return to step 210. If the result of step 212 is yes, then step 214 tests whether for the present couplet the second part is being awaited. If no, step 216 determines whether it is the first part, and if no again, step 218 ignores the chord and returns to step 210 to await a further chord, If, however, it is the first part of the chord, then step 220 sets the "waiting" flag and returns to step 210. In step 214, if yes, step 220 determines whether the chord is the second part, and if not loops to step 210, but if so, step 222 clears the "waiting" flag and forwards the couplet press.

FIG. 24 represents the combined chording/qwerty operation. Step 230 awaits the next press, and on receipt of such tests whether chording is allowed in step 232. If no, the key press is forwarded for its qwerty value by step 234. If chording is allowed, then step 236 determines whether the value is for a chord key (i.e. the home keys as described). If not, step 238 determines whether operation is for chording only, and if so, step 240 therefore ignores the key press, and otherwise the key pressed value is forwarded in step 242 for its usual qwerty value. If, in step 236, the key press value is for a chord, step 242 forms the chord. There then follows a determination in step 242 of whether the chord is a singleton chord, and if not, step 244 sends the chord pressed value, but if so, step 246 determines whether singleton chords are allowable, and if not, step 248 forwards the nominal qwerty key value. If singletons are allowed, then step 250 sends the chord pressed value.

The following coding is included for illustrative purposes, and is consistent with the flow diagrams of FIGS. 22 to 24. The coding is written to run on the program ToolBook (TM) version 3.0, which is a Windows (TM)-based multi-media authoring tool published by Asymetrix Corporation of the United States. The code is commented, as indicated by the prefix "- - - ".

```
to set KSQwertyOn to offOn          --allow external objects to change KordOS
system QwertyOn                     --internal settings
set QwertyOn to offOn               --this setting allows normal KBD
end
to set KSremainderOn to offOn
system remainderOn                  --allows non-chordal KBD presses
set remainderOn to offOn
end
to set KSChordingOn to offOn
system ChordingOn                   --Chording master on/off switch
set ChordingOn to offOn
end
to set KSQwertyOnly to offOn
system QwertyOnly                   --locks out chords
set QwertyOnly to offOn
end
to set KSPressReleaseType to Pval
system pressReleaseType             --chord formed instantly or on release
set PressReleaseType to Pval
end
to handle Keydown vkey              --handle the ToolBook (TBK) message
                                    --message Keydown ie. a KBD key
system remainderOn                  --declare system vars for this handler
system QwertyOn
system QwertyOnly
system ChordingOn
system pressRelease Type
get ChordingOn                      --check if on, skip if not
forward
```

```
break
end
system chordList[31]              --initialise left & right hands
RT = keyspace
R1 = keyj
R2 = keyk
R3 = keyl
R4 = keysemicolon
LT = keyspace
L1 = keyf
L2 = keyd
L3 = keys
L4 = keya
vvkey = lowercase(vkey)           --filter upper case of message parameter
if vvkey = RT or VVkey = R1 or VVkey = R2 or vvkey = R3 or vvkey = R4\
or vvkey = LT or vvkey = L1 or vvkey = L2 or vvkey = L3 or vvkey = L4 then
                                  --check if its a Kording key on KBD
set chord to 0                    --reset local variables
set thumbPressed to false
set firstPressed to false
set secondPressed to false
set thirdPressed to false
set fourthPressed to false
if pressReleaseType = "WaitForRelease" then    --check how the chord is made
   do
   if keyState(RT) is "down" or keystate(LT) is "down" --keyState() is aTBK
   func'n
   set thumbPressed to true
   end
   if keyState(R1) is "down" or keystate(L1) is "down"
   set firstPressed to true
   end
   if keyState(R2) is "down" or keystate(L2) is "down"
   set secondPressed to true
   end
   if keyState(R3) is "down" or keystate(L3) is "down"
   set thirdPressed to true
   end
   if keyState(R4) is "down" or keystate(L4) is "down"
   set fourthPressed to true
   end
   until keyState(RT) is "up" and keyState(R1) is "up"\
   and keyState(R2) is "up" and keyState(R3) is "up"\
   and keyState(R4) is "up"
if qwertyon = 'false'             --
get flushmessagequeue()           --clear the KBD buffer
end
end
if pressReleaseType = "instant" then    --the other way of chording
   pause 15                       --debounce other keys
   if keyState(RT) is "down" or keystate(LT) is "down"
   set thumbPressed to true
   end
   if keyState(R1) is "down" or keystate(L1) is "down"
   set firstPressed to true
   end
   if keyState(R2) is "down" or keystate(L2) is "down"
   set secondPressed to true
   end
   if keyState(R3) is "down" or keystate(L3) is "down"
   set thirdPressed to true
   end
   if keystate(R4) is "down" or keystate(LA) is "down"
   set fourthPressed to true
   end
if qwertyon = "false"
get flushmessagequeue()
end
end
if fourthPressed is true          --build raw chord value
set chord to 1
end
if thirdPressed is true
chord = chord + 2
end
if secondPressed is true
chord = chord + 4
end
if firstPressed is true
chord = chord + 8
```

-continued

```
    end
    if thumbPressed is true
    chord = chord + 16
    end
    if chord = 0 then                    --internal error trap
    get flushmessagequeue()
    break
    end
    if qwertyon = 'true' then            --forward singleton chords
        if chord = 1 or chord = 2 or chord = 4 or chord = 8 or chord = 16 then
        forward
        break
        end
    end
    get flushMessagequeue()              --clear KBD buffer
    chordval = chordlist[chord]          --look up the content of raw chord
    send kordPressed chordval to this Page   --sendmessage to graphic Page
                                         --a TBK structure
                                         --page forwards message to all
                                         --objects on it
    else                                 --end of test for non-finger chars
                                         --below we handle   "      "
    if remainderOn = "true" then         --they want all non-chord values
    forward
    else
    get flushMessagequeue()              --another obsessive clear
    end
    end
end
to handle enterbook                      --initialise this system book on startup
send resetKords                          --sends message resetKords
end
to handle resetKords                     --set the raw chord contents
--put otherChords = "      "here
Handchords =
"1,2,3,4,5,6,7,8,9,10,11,12,13,14,15,16,17,18,19,20,21,22,23,24,25,25,27,28,29,30,
31"
dotChords =
"....|....|,....||,..|,...|,..||,,...|||,..|,....|-|,-|,-|-|,-|||,,,-||-|,-|||,,.||||,....|...|-|,-|,-.||,|-|,...-|,|-|,||.,
|.|||,||...,||..|,|..|,.||-|,|||...-|||-|,|||,.||||"
system chordList[31]
fill chordlist with handChords in [item] order
system remainderOn                       --declare system vars for this handler
system QwertyOn
system QwertyOnly
system ChordingOn
system PressReleaseType
set qwertyon to "false"                  --reset to known state
set remainderOn to "true"
set QwertyOnly to "false"
set ChordingOn to "true"
set PressReleaseType to "WaitForRelease"
end
--this is a typical button handler, it receives the message from the page
--this script is contained
to handle Kordpressed kordval
    if kordval = myKordval of self       --check the parameter of the message
                                         --my predefined attribute, ie. is it me?
    --**** perform some action
    end
end
to handle buttonClick                    --allows mouse clicks
send Kordpressed myKordval to self       --trick me that a key is pressed
end
```

Embodiments of the present invention have industrial applicability at least in terms of rendering useful computing devices adapted for portability or use in adverse high motion environments.

I claim:

1. A device having a human/machine interface comprising:

an input device having a plurality of keys each assigned only to a specific single digit of the human hand, the keys being physically arranged to match the relative sequential relation of the digits;

a visual display device; and a processor device receiving instructions or data from the input device and being coupled to the display device, the processor device being programmed to cause the display of a plurality of indicia, wherein each indicium represents a user initiated instruction or data input and is displayed in a manner to indicate which combination of one or more digits effect said instruction or data input, and thus which respective one or more keys are to be activated; and wherein at least one such indicium is displayed in a manner to indicate that a simultaneous combination of digits effect the represented instruction or data input.

2. The device of claim 1, wherein the visual display device is caused by said processor device to be partitioned into a plurality of non-overlapping regions, each region corresponding to one of the digits, and the regions being in the same sequential relation as the digits, and any one or more regions intersected by an indicium corresponding to the combination of digits and thus keys that give effect to the instruction or data input represented by the indicium.

3. The device of claim 2, wherein the indicia and the regions are arranged orthogonally.

4. A human/machine interface program for implementation on a computing device and carried on a storage medium, the computing device including an input device having a plurality of keys each assigned only to a specific single digit of the human hand, the keys being physically arranged to match the relative sequential relation of the digits, a visual display device and a processor device to give effect to the program, the program comprising:

an input element to receive instructions or data from the input device;

an output element to pass display information to the display device; and a processing element, coupled to the input element and the output element, to cause the display of a plurality of indicia, wherein each indicium represents user initiated instructions or data and is displayed in a manner to indicate which combination of one or more digits effect said instruction or data input, and thus which respective one or more keys are to be activated; and wherein at least one such indicium is displayed in a manner to indicate that a simultaneous combination of digits effect the represented instruction or data input.

5. A method for implementing a human/machine interface for a computing device, the computing device including an input device having a plurality of keys each assigned only to a specific single digit of the human hand, the keys being physically arranged to match the relative sequential relation of the digits, and a visual display device; the method comprising the steps, implemented on processor means, of;

visually displaying a plurality of indicia on the display device in a manner to indicate which one or more digits effect said instruction or data input, and thus which respective one or more keys are to be activated, wherein at least one such indicium is displayed in a manner to indicate that a simultaneous combination of digits effect the represented instruction or data input; and effecting a said instruction or data input by the concurrent activation of one or a combination of said keys.

6. The device of claim 1, wherein each indicium is constituted by n first graphical elements and m second graphical elements, the first graphical element representing activation of the respective key and the second graphical element representing non-activation of the respective key.

7. The device of claim 6, wherein said plurality of keys are z in number, and wherein n is in the range of 0 to z, with m correspondingly in the range z to 0.

8. The device of claim 7, wherein z is equal to 5.

9. The device of claim 6, wherein the first graphical element is a stroke and the second graphical element is a dot.

10. The device of claim 6, wherein the first graphical element is a shaded or filled form of the second graphical element.

11. The device of claim 6, wherein the first graphical element is an extended digit and the second graphical element is a retracted digit.

12. The device of claim 2, wherein said plurality of non-overlapping regions are five in number, and said plurality of keys are also five in number.

13. The interface program of claim 4, wherein the visual display device is caused by said processor device to be partitioned into a plurality of non-overlapping regions, each region corresponding to one of the digits, and the regions being in the same sequential relation as the digits, and any one or more regions intersected by an indicium corresponding to the combination of digits and thus keys that give effect to the instruction or data input represented by the indicium.

14. The interface program of claim 13, wherein the indicia and the regions are arranged orthogonally.

15. The interface program of claim 4, wherein each indicium is constituted by n first graphical elements and m second graphical elements, the first graphical element representing activation of the respective key and the second graphical element representing non-activation of the respective key.

16. The interface program of claim 15, wherein said plurality of keys are z in number, and wherein n is in the range of 0 to z, with m correspondingly in the range z to 0.

17. The interface program of claim 16, wherein z is equal to 5.

18. The interface program of claim 15, wherein the first graphical element is a stroke and the second graphical element is a dot.

19. The interface program of claim 15, wherein the first graphical element is a shaded or filled form of the second graphical element.

20. The interface program of claim 15, wherein the first graphical element is an extended digit and the second graphical element is a retracted digit.

21. The interface program of claim 13, wherein said five non-overlapping regions are five in number, and said keys are also five in number.

22. The device of claim 1, wherein said simultaneous combination of digits effect the represented instruction or data input by coincidental release of said keys.

23. The interface program of claim 4, wherein said simultaneous combination of digits effect the represented instruction or data input by coincidental release of said keys.

24. The method of claim 5, wherein said simultaneous combination of digits effect the represented instruction or data input by coincidental release of said keys.

* * * * *